(12) United States Patent
Sha et al.

(10) Patent No.: US 12,513,739 B2
(45) Date of Patent: Dec. 30, 2025

(54) METHOD OF TIMING ADVANCE UPDATE OF PRECONFIGURED UPLINK RESOURCE, AND USER EQUIPMENT

(71) Applicant: ZTE Corporation, Guangdong (CN)

(72) Inventors: Xiubin Sha, Guangdong (CN); Bo Dai, Guangdong (CN); Ting Lu, Guangdong (CN); Li Niu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 318 days.

(21) Appl. No.: 18/217,400

(22) Filed: Jun. 30, 2023

(65) Prior Publication Data
US 2023/0362982 A1 Nov. 9, 2023

Related U.S. Application Data

(63) Continuation of application No. PCT/CN2022/071985, filed on Jan. 14, 2022.

(30) Foreign Application Priority Data

Apr. 1, 2021 (CN) .......................... 202110357557.0

(51) Int. Cl.
*H04L 1/1607* (2023.01)
*H04W 72/0446* (2023.01)
(Continued)

(52) U.S. Cl.
CPC .......... *H04W 74/004* (2013.01); *H04L 1/1678* (2013.01); *H04W 72/0446* (2013.01); *H04W 74/0833* (2013.01); *H04W 28/0908* (2020.05)

(58) Field of Classification Search
CPC .. H04L 1/1678; H04W 84/06; H04W 36/249; H04W 28/0908; H04W 72/0446
See application file for complete search history.

(56) References Cited

U.S. PATENT DOCUMENTS

2017/0142708 A1 5/2017 Ho et al.
2020/0077447 A1* 3/2020 Yang ................. H04W 72/0446
(Continued)

FOREIGN PATENT DOCUMENTS

CN 110536470 A 12/2019
WO 2019231305 A1 12/2019
(Continued)

OTHER PUBLICATIONS

R2-2101551, "Correction to timing alignment validation for transmission using PUR", Jan 25-Feb. 5, 2021, pp. 1-11 (Year: 2021).*
(Continued)

*Primary Examiner* — Salvador E Rivas
(74) *Attorney, Agent, or Firm* — Perkins Coie LLP

(57) ABSTRACT

Provided are a channel transmission method and apparatus, a UE, a base station, and a storage medium, where the method includes: receiving preconfigured uplink resource (PUR) configuration information configured by a base station through dedicated signaling; in response to determining before a time domain location of a PUR resource corresponding to the PUR configuration information that the PUR resource belongs to a current camping cell, determining a timing advance (TA); and in response to being in a target service state, sending a physical uplink shared channel (PUSCH) using the TA on the PUR resource, where the target service state indicates that no radio resource control (RRC) connection exists with the base station.

10 Claims, 9 Drawing Sheets

Update a timing advance (TA) of a preconfigured uplink resource (PUR) resource according to a received random access response message ~610

(51) Int. Cl.
  *H04W 74/00*   (2009.01)
  *H04W 74/0833* (2024.01)
  *H04W 28/08*   (2023.01)

(56) References Cited

U.S. PATENT DOCUMENTS

| | | | |
|---|---|---|---|
| 2021/0029658 A1* | 1/2021 | Mahalingam | H04B 7/1851 |
| 2021/0274526 A1 | 9/2021 | Shin et al. | |
| 2021/0314925 A1* | 10/2021 | Shin | H04L 5/0053 |
| 2022/0104158 A1 | 3/2022 | Liu et al. | |
| 2022/0167385 A1* | 5/2022 | Takeda | H04L 1/1671 |
| 2022/0224406 A1* | 7/2022 | Xu | H04W 72/02 |
| 2023/0180303 A1* | 6/2023 | Wu | H04W 56/0045 370/329 |

FOREIGN PATENT DOCUMENTS

| | | | |
|---|---|---|---|
| WO | 2020032629 A1 | 2/2020 | |
| WO | 2020032732 A1 | 2/2020 | |
| WO | 2020151624 A1 | 7/2020 | |

OTHER PUBLICATIONS

R2-2101550, "Timing alignment validation for transmission using PUR", Jan. 25-Feb. 5, 2021, pp. 1-4 (Year: 2021).*
European Search Report issued in EP Patent Application No. 22778309.9, dated Jun. 11, 2024, 13 pages.
International Search Report and Written Opinion for International Application No. PCT/CN2022/071985, mailed on Mar. 28, 2022. 8 pages with translation.
Ericsson, "New WID on Rel-16 MTC enhancements for LTE," 3GPP TSG RAN Meeting #80, RP-181450, La Jolla, USA, Jun. 11-14, 2018, 4 pages.
Huawei, "Summary of email discussion [99#42][NB-IoT] on SPS options," 3GPP TSG-RAN WG2 Meeting#99bis, R2-1711329, Prague, Czech Republic, Oct. 9-13, 2017, 23 pages.
Samsung, "On timing relationship enhancements," 3GPP TSG RAN WG1 #104-e, e-Meeting, Jan. 25-Feb. 5, 2021, R1-2101244, 5 pages.
Lenovo, Motorola Mobility, "Considerations on PUR IoT NTN," 3GPP TSG-RAN WG2 Meeting #113 electronic, online Jan. 25-Feb. 5, 2021, R2-2101130, 4 pages.
Notification of Reasons for Refusal for Japanese Application No. 2023-556571, dated Oct. 1, 2024, with translation, 8 pages.
Chinese office action issued in CN Patent Application No. 202110357557.0, dated Jun. 6, 2024, 10 pages. English translation included.
Chinese office action issued in CN Patent Application No. 202110357557.0, dated Oct. 11, 2024, 7 pages. English translation included.
Chinese office action issued in CN Patent Application No. 202110357557.0, dated Feb. 12, 2025, 8 pages. English translation included.
Chinese Notice to Grant Patent for Invention issued in CN Patent Application No. 202110357557.0, dated Apr. 4, 2025, 2 pages. English translation included.

* cited by examiner

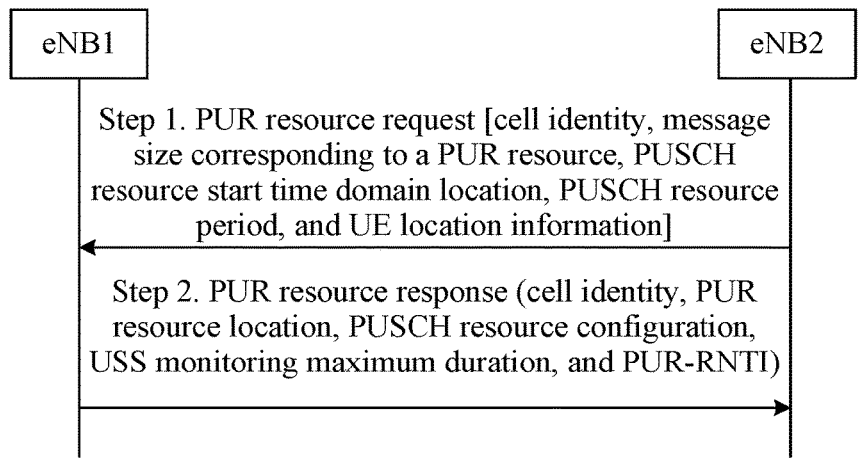
FIG. 7
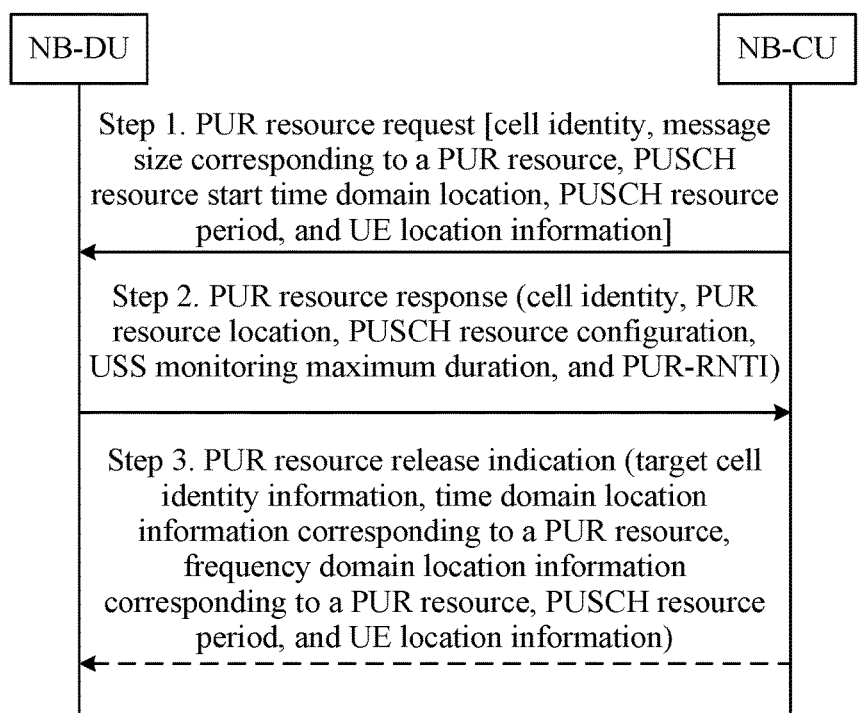
FIG. 8
Update a timing advance (TA) of a preconfigured uplink resource (PUR) resource according to a received random access response message ~610
FIG. 9

METHOD OF TIMING ADVANCE UPDATE OF PRECONFIGURED UPLINK RESOURCE, AND USER EQUIPMENT

CROSS-REFERENCES TO RELATED APPLICATIONS

This application is a continuation of International Patent Application No. PCT/CN2022/071985, filed Jan. 14, 2022, which is based on and claims priority to Chinese Patent Application No. 202110357557.0 filed with the China National Intellectual Property Administration (CNIPA) on Apr. 1, 2021, the disclosure of each of which is incorporated herein by reference in their entirety.

TECHNICAL FIELD

The present application relates to the field of wireless communications, for example, to a channel transmission method and apparatus, a user equipment, a base station, and a storage medium.

BACKGROUND

In narrowband Internet of Things (NB-IOT) and enhanced machine-type communication (eMTC) terrestrial networks, in order to save energy of a user equipment (UE), the PUR function is introduced. A physical uplink shared channel (PUSCH) link resource is preconfigured for a UE with a fixed traffic mode, and a UE in a radio resource control (RRC) idle (RRC_IDLE) state or an RRC inactive (RRC_INACTIVE) state may directly send uplink data on the preconfigured PUSCH resource, thereby saving the access procedure of a physical random access channel (PRACH) and reducing the power consumption of the UE. However, the use premise of the PUR function is that a timing advance (TA) of the UE remains unchanged, and the way to ensure that the TA of the UE remains unchanged is that the UE is in a static state. In this manner, in NB-IOT and eMTC terrestrial networks, the PUR function is only applicable to static UEs.

But for non-terrestrial networks (NTNs), especially low earth orbit satellite radio networks, even if the UE is in a static state, the satellite still moves. That is, a cell and a satellite may be in a relative moving state, which leads to that the cell that configures PUR resources for the UE may not be the cell that finally carries out PUR transmission on the UE and that the TA of the UE is also changing all the time. In this manner, the PUR function cannot be applied in NTNs. At present, a channel transmission method based on the PUR function is urgently needed in NTN networks.

SUMMARY

Embodiments of the present application provide a channel transmission method and apparatus, a UE, a base station, and a storage medium, so as to achieve channel transmission based on a PUR function in non-terrestrial networks, save radio resources and reduce the power consumption of a UE.

The embodiments of the present application provide a channel transmission method. The method includes: receiving PUR configuration information configured by a base station through dedicated signaling; in response to determining before a time domain location of a PUR resource corresponding to the PUR configuration information that the PUR resource belongs to a current camping cell, determining a TA; and in response to being in a target service state, sending PUSCH using the TA on the PUR resource, where the target service state indicates that no RRC connection exists with the base station.

The embodiments of the present application further provide a channel transmission method. The method includes: configuring PUR configuration information of a UE through dedicated signaling; and receiving a PUSCH transmitted on a PUR resource corresponding to the PUR configuration information.

The embodiments of the present application further provide a TA update method. The method includes: updating a TA of a PUR resource according to a received random access response message.

The embodiments of the present application further provide a channel transmission method. The method includes: common PUR configuration information configured by a base station through common signaling is acquired; and a TA is determined, and a PUSCH is sent on common PUR resources corresponding to the common PUR configuration information according to the TA.

The embodiments of the present application further provide a channel transmission method. The method includes: configuring common PUR configuration information of a UE through common signaling; and receiving a PUSCH sent on a common PUR resource corresponding to the common PUR configuration information.

The embodiments of the present application further provide a channel transmission apparatus. The apparatus includes a configuration receiving module, a TA module, and a channel sending module.

The configuration receiving module is configured to receive PUR configuration information configured by a base station through dedicated signaling.

The TA module is configured to, in response to determining before a time domain location of a PUR resource corresponding to the PUR configuration information that the PUR resource belongs to a current camping cell, determine a TA.

The channel sending module is configured to, in response to being in a target service state, send a PUSCH using the TA on the PUR resource, where the target service state indicates that no RRC connection exists with the base station.

The embodiments of the present application further provide another channel transmission apparatus. The apparatus includes an information configuration module and a channel receiving module.

The information configuration module is configured to configure PUR configuration information of a UE through dedicated signaling.

The channel receiving module is configured to receive a PUSCH transmitted on a PUR resource corresponding to the PUR configuration information.

The embodiments of the present application further provide a UE. The UE includes: one or more processors; and a memory, configured to store one or more programs.

The one or more programs, when executed by the one or more processors, cause the one or more processors to perform the channel transmission method as described in any one of the embodiments of the present application.

The embodiments of the present application further provide a base station. The base station includes: one or more processors; and a memory, configured to store one or more programs.

The one or more programs, when executed by the one or more processors, cause the one or more processors to perform the channel transmission method as described in any one of the embodiments of the present application.

The embodiments of the present application further provide a computer-readable storage medium. The computer-readable storage medium stores a computer program, where the computer program, when executed by a processor, performs the channel transmission method as described in any one of the embodiments of the present application and the TA update method as described in any one of the embodiments of the present application.

The embodiments of the present application further provide a UE. The UE includes: one or more processors; and a memory, configured to store one or more programs.

The one or more programs, when executed by the one or more processors, cause the one or more processors to perform the TA update method as described in any one of the embodiments of the present application or the channel transmission method as described in any one of the embodiments of the present application.

The embodiments of the present application further provide a base station. The base station includes: one or more processors; and a memory, configured to store one or more programs.

The one or more programs, when executed by the one or more processors, cause the one or more processors to perform the channel transmission method as described in any one of the embodiments of the present application.

In the embodiments of the present application, PUR configuration information configured by a base station through dedicated signaling is received, where the PUR configuration information is transmitted through dedicated signaling. In response to determining before the time domain location of a PUR resource corresponding to the PUR configuration information that the PUR resource belongs to a current camping cell, a TA is determined; and in response to being in a state where no RRC connection exists with the base station, a PUSCH is sent based on the TA on the PUR resource, thereby achieving channel transmission based on the PUR function in non-terrestrial networks, saving radio resources and reducing the power consumption of the UE.

BRIEF DESCRIPTION OF DRAWINGS

FIG. 7 is a diagram showing a PUR resource configuration according to an embodiment of the present application;

FIG. 8 is a diagram showing another PUR resource configuration according to an embodiment of the present application;

FIG. 9 is a flowchart of a TA update method according to an embodiment of the present application;

DETAILED DESCRIPTION

It is to be understood that the embodiments described herein are intended to explain the present application and not to limit the present application.

Terms such as "module", "part" or "unit" used for indicating elements in the subsequent description are used for facilitating the description of the present application and have no particular meaning in themselves. Therefore, "module", "part" or "unit" may be used in a mixed manner.

Figure 1:
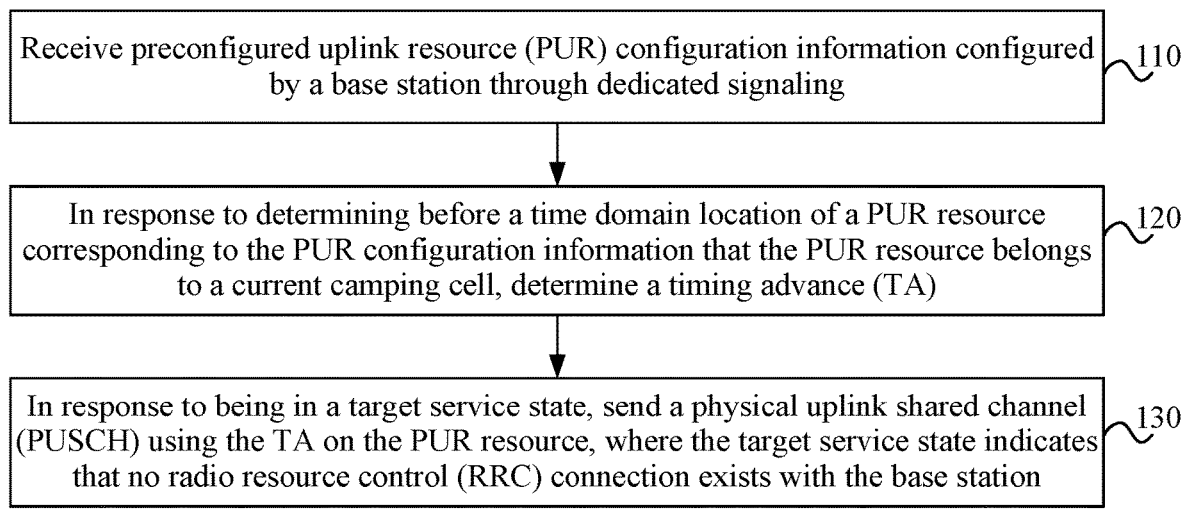
FIG. 1 is a flowchart of a channel transmission method according to an embodiment of the present application.

FIG. 1 is a flowchart of a channel transmission method according to an embodiment of the present application. This embodiment of the present application is applicable to the case of supporting PUR transmission in a non-terrestrial network. The method may be implemented by a software and/or hardware method and is generally integrated into a UE. The UE may be in a state where no RRC connection exists with a base station, where the state may include an RRC_IDLE state and an RRC_INACTIVE state. With reference to FIG. 1, the method provided by this embodiment of the present application specifically includes 110, 120, and 130.

In 110, PUR configuration information configured by a base station through dedicated signaling is received.

The dedicated signaling may be signaling sent from the base station to a UE, and the signaling is configured for transmitting the PUR configuration information. The PUR configuration information may be information for configuring a preconfigured uplink resource, and may be determined by the base station or predefined.

In this embodiment of the present application, the UE may receive the PUR configuration information configured by the base station through the dedicated signaling. It is to be understood that the dedicated signaling may carry the PUR configuration information or the dedicated signaling may indicate the PUR configuration information. For example, multiple sets of PUR configuration information are configured in the UE, and the corresponding PUR configuration information may be selected according to the dedicated signaling.

In 120, in response to determining before a time domain location of a PUR resource corresponding to the PUR configuration information that the PUR resource belongs to a current camping cell, a TA is determined.

The TA may be an amount of time by which a system frame instructing the UE to send uplink data advances a downlink frame when the UE transmits uplink data.

For example, a UE in the RRC_IDLE or RRC_INACTIVE state may configure a PUR resource according to the PUR configuration information and determine whether the configured PUR resource is a resource of the cell where the UE currently camps before the start of the PUR resource, and if the configured PUR resource is a resource of the cell where the UE currently camps, the UE may perform communication according to the PUR resource and determine the TA.

In 130, in response to being in a target service state, a PUSCH is sent using the TA on the PUR resource, where the target service state indicates that no RRC connection exists with the base station.

The target service state may be a service state where the UE currently is, for example, the state where no RRC connection exists between the UE and the base station, such as an RRC_IDLE state or an RRC_INACTIVE state.

In this embodiment of the present application, when the UE is in the target service state, the PUSCH may be sent on the PUR resource based on the TA to achieve the transmission of the PUSCH.

In this embodiment of the present application, PUR configuration information configured by a base station is received, where the PUR configuration information is transmitted through dedicated signaling; in response to determining before a time domain location of a PUR resource corresponding to the PUR configuration information that the PUR resource belongs to a current camping cell, a TA is determined; and a PUSCH is sent on the PUR resource based on the TA, thereby achieving channel transmission based on the PUR function in non-terrestrial networks, saving radio resources and reducing the power consumption of the UE.

In an embodiment, on the basis of the embodiment described above, the target service state includes at least one of: an RRC_IDLE state or an RRC_INACTIVE state.

For example, when the UE is in the RRC_IDLE state or the RRC_INACTIVE state, the UE may send a PUSCH on a PUR resource using the extracted determined TA.

In an embodiment, on the basis of the embodiments described above, the PUR configuration information includes at least one of: a PUR period, a PUR response time window timer (PUR-ResponseWindowTimer), a cell identity (ID), a PUR-UE search space (PUR-USS), a PUSCH resource configuration, time domain start location information of a PUSCH resource, frequency domain location information of the PUSCH resource, a pur-TimeAlignment-Timer, a reference signal receiving power (RSRP) change threshold, a UE search space (USS) monitoring maximum duration, a PUR-radio network temporary identifier (PUR-RNTI), a PUR resource effective number, a serving cell preamble, a neighboring cell preamble, a serving cell response reference signal configuration, a neighboring cell response reference signal configuration, a scheduling request resource or a configured grant (CG) resource.

In an embodiment, on the basis of the embodiments described above, the PUR configuration information includes PUR resource lists of at least two cells, where each PUR resource list includes at least one of:

a PUR resource common configuration portion or a PUR resource cell-level configuration portion, where the PUR resource common configuration portion includes at least one of: a PUR period or a PUR-ResponseWindowTimer, and the PUR resource cell-level configuration portion includes at least one of: a cell ID, a PUR-USS, a PUSCH resource configuration, time domain start location information of the PUSCH resource, frequency domain location information of the PUSCH resource, a pur-TimeAlignmentTimer, an RSRP change threshold, a USS monitoring maximum duration, a PUR-RNTI or a PUR resource effective number.

In this embodiment of the present application, the PUR configuration information may be configured for a cell, different cells have various corresponding PUR resource lists, and the PUR resource list may include at least one of: a PUR resource common configuration portion, a PUR resource cell-level configuration portion, time domain start location information of the PUSCH resource, frequency domain location information of the PUSCH resource, a pur-TimeAlignmentTimer, an RSRP change threshold, a PUR-RNTI or a PUR resource effective number.

In an embodiment, on the basis of the embodiments described above, time domain location information of the PUSCH resource is represented in at least one of the following manners. The time domain location information of the PUSCH resource is represented according to the absolute time of a satellite clock; or the time domain location information of the PUSCH resource is represented according to the absolute time of the satellite clock and the relative time of wireless synchronization with the base station.

The satellite clock may be clock information in the wireless communication time domain, and clock information in a non-terrestrial network may be a satellite clock.

For example, a time domain location in a non-terrestrial network may be represented using a satellite clock, may be directly represented using the absolute time of the satellite clock, or may be represented using the absolute time of the satellite clock plus relative time of a delay of wireless synchronization between the UE and the base station.

In an embodiment, on the basis of the embodiments described above, the TA is determined in at least one of the following manners: the TA is acquired according to historical TA record information, where a validity of the historical TA record information is determined through a pur-TimeAlignmentTimer and/or an RSRP change threshold; or the TA is acquired according to satellite positioning information.

In an embodiment, on the basis of the embodiments described above, the pur-TimeAlignmentTimer is configured in at least one of the following manners.

The pur-TimeAlignmentTimer is configured according to a UE; or the pur-TimeAlignmentTimer is configured according to a PUR resource cell-level configuration portion.

In this embodiment of the present application, the pur-TimeAlignmentTimer in the PUR configuration information may be configured for the UE, and each UE corresponds to a corresponding pur-TimeAlignmentTimer; and the pur-TimeAlignmentTimer of the PUR resource may also be configured based on the cell level, and each PUR resource of each cell corresponds to a pur-TimeAlignmentTimer.

In an embodiment, in this embodiment of the present application, when the base station configures the PUR resource, the configured PUR resource may be acquired from the base station or a distributed unit of the base station.

Figure 2:
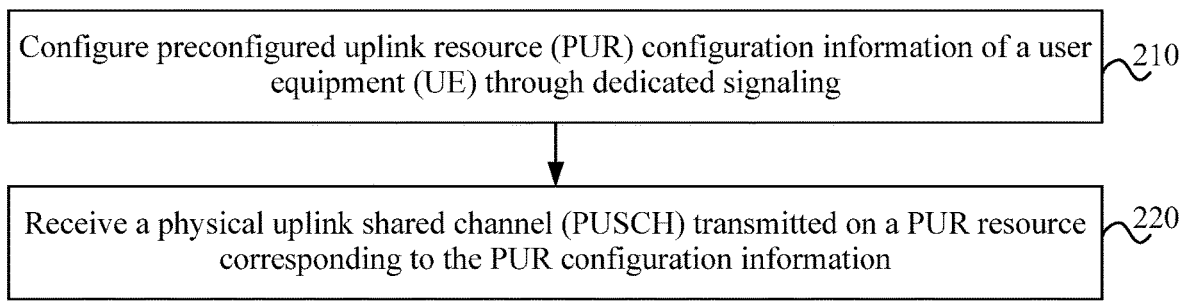
FIG. 2 is a flowchart of another channel transmission method according to an embodiment of the present application.

FIG. 2 is a flowchart of another channel transmission method according to an embodiment of the present application. This embodiment of the present application is applicable to the case of supporting PUR transmission in a non-terrestrial network. The method may be implemented by a software and/or hardware method and is generally integrated into a base station. With reference to FIG. 2, the method provided by this embodiment of the present application specifically includes 210 and 220.

In 210, PUR configuration information of a UE is configured through dedicated signaling.

For example, the base station may configure the PUR configuration information of the UE through dedicated signaling, where the dedicated signaling may be signaling sent by the base station to the UE, and the dedicated signaling is configured for transmitting the PUR configuration information. The PUR configuration information may be information for configuring a preconfigured uplink resource, and may be determined by the base station or predefined.

In 220, a PUSCH transmitted on a PUR resource corresponding to the PUR configuration information is received.

In this embodiment of the present application, the UE may configure the PUR resource according to the PUR configuration information and send the PUSCH to the base station on the PUR resource, and the base station may receive the PUSCH transmitted on the PUR resource corresponding to the PUR configuration information.

In this embodiment of the present application, the PUR configuration information of the UE is configured through dedicated signaling, and the PUSCH transmitted on the PUR resource corresponding to the PUR configuration information is received, thereby achieving channel transmission based on the PUR function in non-terrestrial networks, saving radio resources and reducing the power consumption of the UE.

In an embodiment, on the basis of the embodiments described above, the PUR configuration information includes at least one of:
a PUR-ResponseWindowTimer, a cell ID, a PUR-USS, a PUSCH resource configuration, a PUR period, time domain start location information of the PUSCH resource, frequency domain location information of the PUSCH resource, a pur-TimeAlignmentTimer, an RSRP change threshold, a USS monitoring maximum duration, a PUR-RNTI, a PUR resource effective number, a serving cell preamble, a neighboring cell preamble, a serving cell response reference signal configuration, a neighboring cell response reference signal configuration, a scheduling request resource or a CG resource.

In an embodiment, on the basis of the embodiments described above, the PUR configuration information includes PUR resource lists of at least two cells, where each PUR resource list includes at least one of: a PUR resource common configuration portion or a PUR resource cell-level configuration portion. Where the PUR resource common configuration portion includes at least one of: a PUR period or a PUR-ResponseWindowTimer, and the PUR resource cell-level configuration portion includes at least one of: a cell ID, a PUR-USS, a PUSCH resource configuration, time domain start location information of the PUSCH resource, frequency domain location information of the PUSCH resource, a pur-TimeAlignmentTimer, an RSRP change threshold, a USS monitoring maximum duration, a PUR-RNTI or a PUR resource effective number.

In an embodiment, on the basis of the embodiments described above, the time domain location information of the PUSCH resource is represented in at least one of the following manners: the time domain location information of the PUSCH resource is represented according to the absolute time of a satellite clock; or the time domain location information of the PUSCH resource is represented according to the absolute time of the satellite clock and the relative time of wireless synchronization with the UE.

For example, a time domain location in a non-terrestrial network may be represented using a satellite clock, may be directly represented using the absolute time of the satellite clock, or may be represented using the absolute time of the satellite clock plus relative time of a delay of wireless synchronization between the UE and the base station.

In an embodiment, on the basis of the embodiments described above, the TA is determined in at least one of the following manners: the TA is acquired according to historical TA record information, where a validity of the historical TA record information is determined through a pur-TimeAlignmentTimer and/or an RSRP change threshold; or the TA is acquired according to satellite positioning information.

Figure 3:
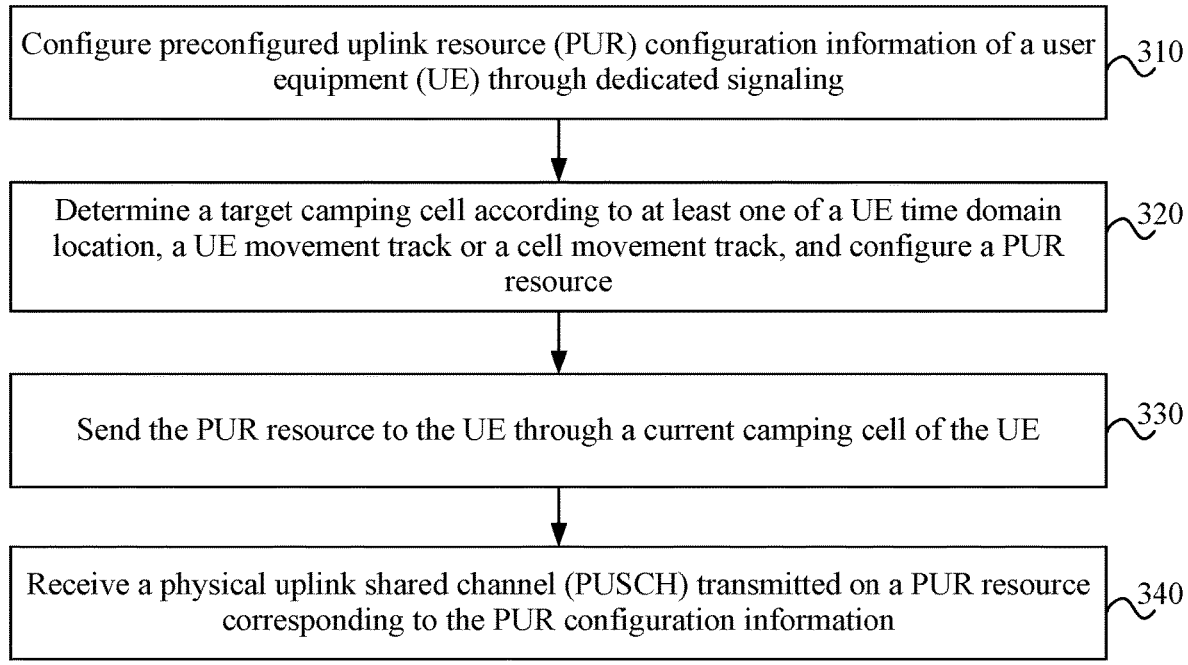
FIG. 3 is a flowchart of another channel transmission method according to an embodiment of the present application.

FIG. 3 is a flowchart of another channel transmission method according to an embodiment of the present application. This embodiment of the present application is an example on the basis of the embodiments described above. With reference to FIG. 3, the method provided by this embodiment of the present application specifically includes 310, 320, 330, and 340.

In 310, PUR configuration information of a UE is configured through dedicated signaling.

In 320, a target camping cell is determined according to at least one of a UE time domain location, a UE movement track or a cell movement track, and a PUR resource is configured.

In this embodiment of the present application, when the base station configures a PUR resource for the UE, the base station may determine a target camping cell according to at least one of a UE time domain location, a UE movement track or a cell movement track and configure a PUR resource, where the target camping cell may be a cell where the UE camps when the UE uses the PUR resource.

In 340, the PUR resource is sent to the UE through a current camping cell of the UE.

For example, the PUR resource may be sent to the UE through the current camping cell of the UE so that the UE acquires the PUR resource.

In 340, a PUSCH transmitted on a PUR resource corresponding to the PUR configuration information is received.

Figure 4:
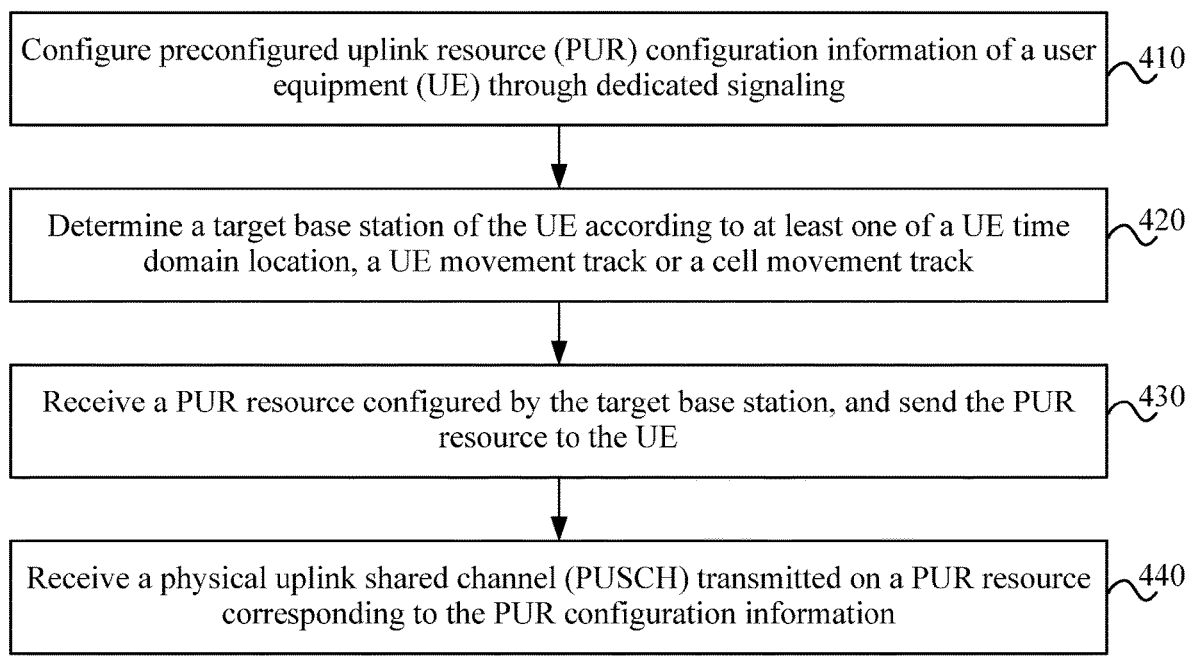
FIG. 4 is a flowchart of another channel transmission method according to an embodiment of the present application.

FIG. 4 is a flowchart of another channel transmission method according to an embodiment of the present application. This embodiment of the present application is an example on the basis of the embodiments described above. With reference to FIG. 4, the method provided by this embodiment of the present application specifically includes 410, 420, 430, and 440.

In 410, PUR configuration information of a UE is configured through dedicated signaling.

In 420, a target base station of the UE is determined according to at least one of a UE time domain location, a UE movement track or a cell movement track.

In this embodiment of the present application, the base station may determine a target base station providing a PUR resource for the UE according to at least one of a UE time domain location of the UE, a UE movement track or a cell movement track and may send a request to the target base station so that the target base station configures a PUR resource for the UE.

In 430, a PUR resource configured by the target base station is received, and the PUR resource is sent to the UE.

For example, a PUR resource configured by the target base station may be received, and the PUR resource may be sent to the UE.

In 440, a PUSCH transmitted on a PUR resource corresponding to the PUR configuration information is received.

Figure 5:
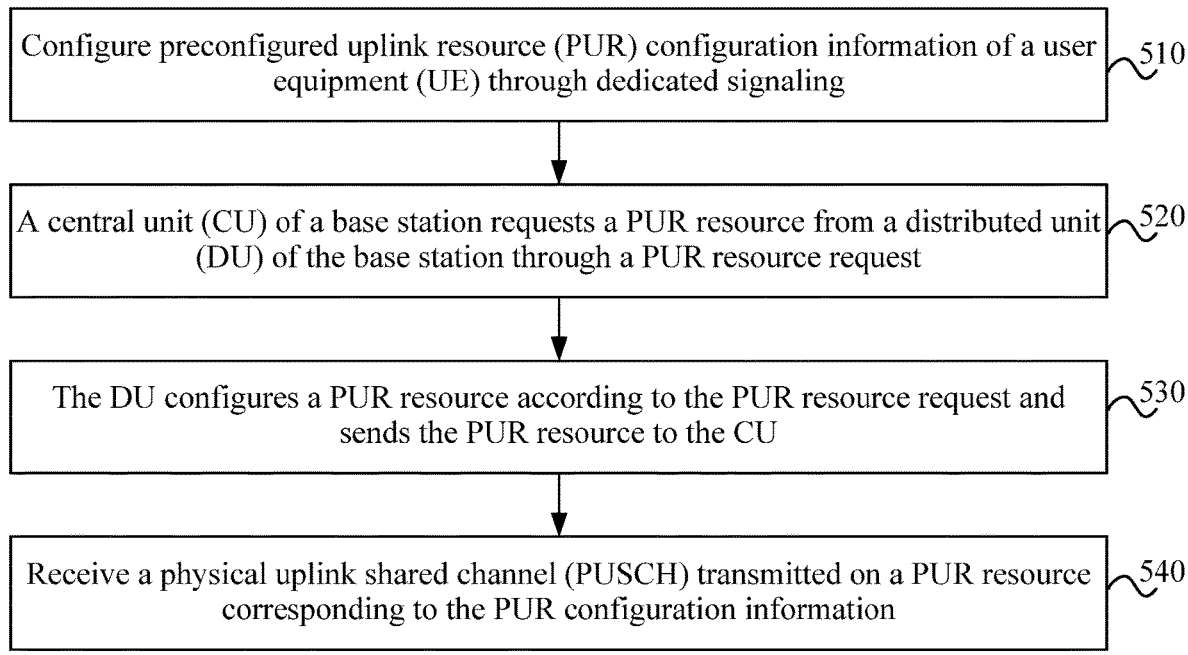
FIG. 5 is a flowchart of another channel transmission method according to an embodiment of the present application.

FIG. 5 is a flowchart of another channel transmission method according to an embodiment of the present application. This embodiment of the present application is an example on the basis of the embodiments described above. With reference to FIG. 5, the method provided by this embodiment of the present application specifically includes 510, 520, 530, and 540.

In 510, PUR configuration information of a UE is configured through dedicated signaling.

In 520, a central unit (CU) of a base station requests a PUR resource from a distributed unit (DU) of the base station through a PUR resource request.

In this embodiment of the present application, the CU of the base station may send a PUR resource request to the DU of the base station to request the DU to configure a PUR resource for the UE.

In 530, the DU configures a PUR resource according to the PUR resource request and sends the PUR resource to the CU.

For example, the DU configures a PUR resource according to the PUR resource request and sends the PUR resource to the CU, and the PUR resource is sent to the UE through the triggering of the CU.

In 540, a PUSCH transmitted on a PUR resource corresponding to the PUR configuration information is received.

In an embodiment, on the basis of the embodiments described above, the PUR resource request includes at least one of: target cell ID information, a PUR resource message size, a time domain start location of a PUSCH resource, a PUSCH resource period, UE location information, UE movement track information or current camping cell location information.

In an embodiment, on the basis of the embodiments described above, the method further includes the following.

The CU sends a PUR resource release indication to the DU to release the PUR resource, where the PUR resource release indication includes at least one of: target cell ID information, a time domain location of the PUR resource and/or a frequency domain location of the PUR resource, a PUSCH resource period or UE location information.

For example, the CU may also send a PUR resource release indication to the DU so that the DU releases the PUR resource configured for the UE, where the PUR resource release indication includes at least one of: target cell ID information, a time domain location of the PUR resource and/or a frequency domain location of the PUR resource, a PUSCH resource period or UE location information.

In an embodiment, on the basis of the embodiments described above, the DU stores time domain information of the PUR resource and frequency domain information of the PUR resource, and the CU stores a security key configured by a PUR and access stratum (AS) context information configured by the PUR.

Figure 6:
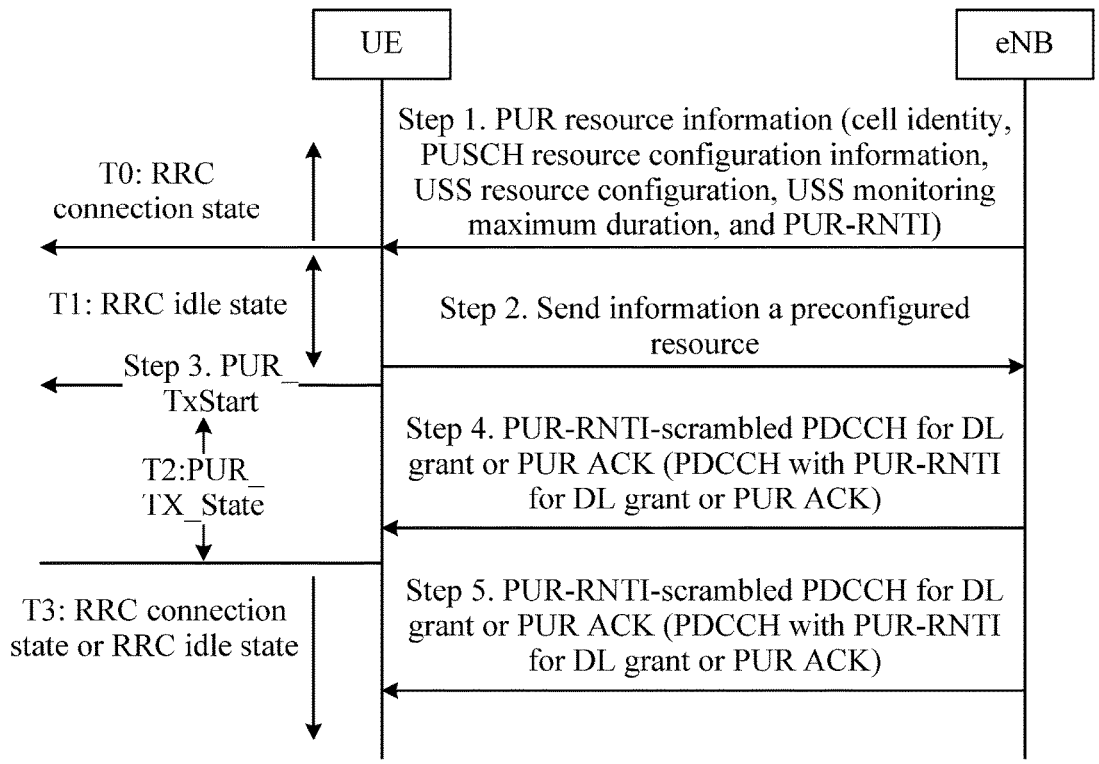
FIG. 6 is a diagram showing a channel transmission method according to an embodiment of the present application.

For example, FIG. 6 is a diagram showing a channel transmission method according to an embodiment of the present application. A base station eNB configures a PUR resource configuration of a UE through dedicated signaling. With reference to FIG. 6, the channel transmission method may include the following processes.

Step 1: The base station configures PUR resource information (which may also be recorded as PUR configuration information) for the UE through dedicated signaling. The PUR configuration information includes at least one of: a PUR period, a PUR-ResponseWindowTimer, a cell ID, a PUR-USS, a PUSCH resource configuration (UL grant), start time domain location information of the PUSCH resource (UL grant), frequency domain location information of the PUSCH resource (UL grant), a pur-TimeAlignmentTimer, an RSRP change threshold for TA decision, a USS monitoring maximum duration, a PUR-RNTI or a PUR resource effective number. The PUR configuration information may also include: a dedicated preamble of a serving cell or a neighboring cell, sounding, a scheduling request (SR), and a CG resource.

The PUR resource may be a PUR resource of a cell where the UE currently camps or a PUR resource (PUR resource list) of one or more other cells.

Step 2: Before the time domain location of the PUR resource, the UE determines whether the PUR dedicated resource configuration belongs to a current camping cell; and if the PUR dedicated resource configuration belongs to the current camping cell, the UE first calculates a TA based on information such as satellite positioning or acquires TA value based on historical TA record information and then performs dedicated PUR transmission on a PUR resource using the calculated TA.

Step 3: At the start location of the PUR resource, if the UE has uplink information to send, a PUSCH is directly sent on the PUSCH resource using the TA information acquired in Step 2.

Step 4: After the UE sends the PUSCH, the UE shifts backward n sub-frames to start monitoring a PUR-RNTI-scrambled physical downlink control channel (PDCCH), where the PDCCH is used for downlink physical downlink shared channel (PDSCH) resource scheduling (DL grant) or PUR transmission acknowledgement (PUR ACK).

In Step 1:

If the PUR resource is PUR resource lists of multiple cells, the resource configuration information may be organized according to the PUR resource common configuration portion (such as a PUR period and a PUR-ResponseWindowTimer) and the PUR resource cell-level configuration portion (such as a cell ID, a PUR-USS, a PUSCH resource configuration (UL grant), start time domain location information of the PUSCH resource (UL grant), frequency domain location information of the PUSCH resource (UL grant), a pur-TimeAlignmentTimer, an RSRP change threshold for TA decision, a PUR-RNTI, and the number of PUR resources).

The start time domain location information of the PUSCH resource may be represented in one of the following manners.

(1) The start time domain location information of the PUSCH resource is represented using absolute time: the absolute time is in the format of [hours:minutes:seconds:milliseconds], which is at least accurate to milliseconds. The UE clock comes from a satellite clock.

(2) The start time domain location information of the PUSCH resource is represented using absolute time and relative time: the absolute time is in the format of [hour:minute:second], which is at least accurate to seconds, and the UE clock comes from a satellite clock; and the relative time is: system frame number+subframe number, which comes from wireless synchronization between the UE and the base station.

In Step 2, if the UE acquires the TA value based on the historical TA record information, the UE needs to store the TA information of the PUR resource time domain location. Whether the stored TA information is valid may be determined by a PUR-TimeAlignmentTimer and/or an RSRP change threshold of PUR TA validity.

The PUR-TimeAlignmentTimer and/or the RSRP change threshold of the PUR TA validity may be configured according to the UE or may be configured as a PUR cell level (PUR resource cell-level configuration portion) (if the PUR resource is a PUR resource list of multiple cells, each cell is configured separately).

If the PUR-TimeAlignmentTimer and/or the RSRP change threshold of the PUR TA validity is configured according to the UE, the PUR-TimeAlignmentTimer is started or restarted when the UE receives the PUR configuration; the PUR-TimeAlignmentTimer is restarted after a timing advance command (TAC) media access control (MAC) control element (CE) is received; and the RSRP change threshold is based on the measured value of an RSRP at the last time when the effective PUR TA is obtained.

If the PUR-TimeAlignmentTimer and/or the RSRP change threshold of the PUR TA validity is configured as a PUR cell level, the PUR-TimeAlignmentTimer is started or restarted at the start location of the PUR resource corresponding to the cell when the UE receives the PUR configuration; the PUR-TimeAlignmentTimer is restarted after a TAC MAC CE) is received; and the RSRP change of the PUR-TA validity is based on the measured value of an RSRP at the last time when the cell obtains the effective PUR TA.

At the time domain location of the PUR resource configuration, if the cell where the UE camps is inconsistent with the cell corresponding to the PUR resource, the UE automatically releases the configured PUR resource (the UE may release the UE-level PUR resource or only release the PUR resource of the cell corresponding to the time domain location of the PUR resource configuration of the UE); and meanwhile, the UE sends the PUR resource release indication to the base station. With reference to FIG. 7, in Step 1, if the PUR resource information configured by the base station to the UE is not the current camping cell of the UE, the PUR configuration information carries the cell ID corresponding to the PUR resource, and the cell ID may be a physical cell identity (PCI) or a cell global identity (CGI). With reference to FIG. 7, if the PUR resource information configured by the base station to the UE belongs to a cell in another base station, the base station first requests a PUR resource from the another base station and then configures the PUR resource allocated by the another base station to the UE.

In FIG. 7, Step 1: the base station 2 (eNB2) where the UE camps calculates a target cell where the UE camps when the UE is at the time domain location of traffic based on the time domain location of the UE traffic, the movement track of the UE and the movement track of the cell, and then requests a PUR resource from the base station 1 (eNB1) to which the target cell belongs. The PUR resource request includes at least one of: a target cell ID, a message size corresponding to a PUR resource, a start time domain location of the PUSCH resource, a PUSCH resource period, UE location information, UE movement track information or current camping cell location information.

Either the target cell ID or (UE location information, UE movement track information, current camping cell location information) in Step 1 may be adopted.

Step 2: The base station where the target cell is located calculates the cell where the time domain location of the UE traffic is located based on the time domain location of the UE traffic, the movement track of the UE and the movement track of the cell, allocates a PUR resource for the UE, and transmits the allocated PUR resource to the base station where the UE currently camps.

If multiple time domain locations of the UE traffic (for example, periodic PUR traffic, and multiple traffic patterns) exist, there may be multiple allocated PUR resources (lists). The allocated PUR resource includes at least one of: a cell ID, a PUR period, a PUR-ResponseWindowTimer, a cell ID, a PUR-USS, a PUSCH resource configuration (UL grant), start time domain location information of the PUSCH resource (UL grant), UL grant frequency domain location information, a USS monitoring maximum duration, a PUR_RNTI, a pur-TimeAlignmentTimer, an RSRP change threshold for TA decision, a PUR-RNTI or the PUR resource effective number.

With reference to FIG. 8, if the base station allocating the PUR resource information for the UE has CU-DU split architecture, the CU first requests a PUR resource from the DU and then configures the PUR resource allocated by the DU to the UE.

In FIG. 8, Step 1: the CU requests a PUR resource from the DU, and the PUR resource request includes at least one of: target cell ID information, a message size corresponding to a PUR resource, a PUSCH resource start time domain location, a PUSCH resource period, UE location information, UE movement track information or current camping cell location information.

Step 2: The DU calculates a cell where the time domain location of the UE traffic is located based on the time domain location of the UE traffic, the movement track of the UE and the movement track of the cell, then allocates a PUR physical layer resource for the UE, and transmits the allocated PUR resource to the CU.

The DU stores the time-frequency domain information of the PUR resource for PUR receiving.

The CU stores complete information such as a security key and AS context configured by the PUR for UE identification, data integrity verification, security decryption, data forwarding, traffic process establishment and the like.

If there are multiple time domain locations of the UE traffic (for example, periodic PUR traffic, and multiple traffic patterns), there may be multiple allocated PUR resources (lists). The allocated PUR resource includes at least one of: target cell ID information, a PUSCH resource configuration (UL grant), start time domain location information of the PUSCH resource (UL grant) or frequency domain location information of the PUSCH resource (UL grant).

Step 3: When the CU releases the PUR resource, the DU is instructed to release the allocated PUR resource. The indication includes at least one of: target cell ID information, a time domain and/or frequency domain location corresponding to the PUR resource, a PUSCH resource period or UE location information.

The target cell ID information may be a cell CGI or a cell index included in the CU.

The signaling interaction of Step 1 to Step 3 may be UE-level signaling without F1 port connection. The difference from the CG resource request when the CU and the DU are split in New Radio (NR) is that: in the NR, CG resource allocation is carried out in UE CONTEXT SETUP or UE CONTEXT MODIFICATION process, which involve UE-levels F1 connection, and the CG resource is used by the UE in the connection mode; however, the signaling in the process herein is only used for allocating and/or releasing PUR resources, a specific resource request and release procedure may be adopted, there may be no complete F1 port UE context (the F1-U connection of the UE is released immediately after resource allocation is completed or is released immediately after the resource is allocated for the UE), and the PUR resource is used by the UE in the idle mode or the RRC_INACTIVE state.

FIG. 9 is a flowchart of a TA update method according to an embodiment of the present application. This embodiment of the present application is applicable to the case of supporting PUR transmission in a non-terrestrial network. The method may be implemented by a software and/or hardware method and is generally applied to a UE. With reference to FIG. 9, the method provided by this embodiment of the present application specifically includes 610.

In 610, a TA of a PUR resource is updated according to a received random access response message. On the basis of this embodiment of the present application, a base station eNB and/or a UE may update the TA of the PUR resource according to the received random access response message.

In an embodiment, on the basis of the embodiment described above, the TA of the PUR resource is updated according to the received random access response message in the following manner.

In response to receiving a random access response message carrying a Timing Advance Command (TAC), a pur-TimeAlignmentTimer of the PUR resource is restarted.

For example, when a random access response message carrying a TAC is received, the pur-TimeAlignmentTimer of the PUR resource may be restarted to achieve the update of the TA.

In an embodiment, on the basis of the embodiments described above, the TA of the PUR resource is updated according to the received random access response message in the following manner including 611 and 612.

In 611, the random access response message is received, and a random access contention resolution procedure is started.

For example, when the random access response message is received, the UE may be controlled to start the random access contention resolution procedure.

In 612, in response to determining that a contention resolution succeeds in a random access procedure (RAP), a TA timer corresponding to a PUR is restarted.

For example, when the contention resolution in the random access procedure succeeds, the UE may be controlled to restart the TA timer corresponding to the PUR.

In an embodiment, on the basis of the embodiments described above, the TA of the PUR resource is updated according to the received random access response message in the following manner including 621 and 622.

In 621, the random access response message is received, a $N_{TA}$ value before the random access response message is received is temporarily recorded, and a TA timer is initialized.

The $N_{TA}$ value may be a timing offset between uplink and downlink radio frames at the UE and is expressed in units of Ts.

In this embodiment of the present application, when the random access response message is received, the $N_{TA}$ value before the random access response message is received is recorded, and the TA timer is controlled to be started or restarted to achieve initialization.

In 622, in response to determining that a contention resolution fails, the $N_{TA}$ value is set to a temporarily recorded $N_{TA}$ value before the random access response message is received, and in response to determining that a contention resolution succeeds, the temporarily recorded $N_{TA}$ value before the random access response message is received is deleted, and a PUR-TA timer is set to a value of the TA timer.

For example, if the contention resolution in the random access procedure fails, the $N_{TA}$ value is set to a recorded $N_{TA}$ value before the random access response message is received, and if the contention resolution in the random access procedure succeeds, the $N_{TA}$ value is deleted, and the PUR-TA timer is set to the value of the TA timer.

In an embodiment, on the basis of the embodiments described above, the TA of the PUR resource is updated according to the received random access response message in the following manner including 631, 632, 633, and 634.

In 631, the random access response message is received, and an $N_{TA}$ value before the random access response message is received and a value of a PUR-TA timer are recorded.

For example, when the random access response message is received, the $N_{TA}$ value and the value of the PUR-TA timer are recorded.

In 632, a TA timer and the PUR-TA timer are restarted.

In this embodiment of the present application, the TA timer and the PUR-TA timer are separately controlled to be restarted to achieve initialization.

In 633, in response to determining that a contention resolution fails, the $N_{TA}$ value is restored to a temporarily recorded $N_{TA}$ value before the random access response message is received, and the PUR-TA timer is reassigned to the sum of the value of the TA timer and the recorded value of the PUR-TA timer.

For example, when the contention resolution in the random access procedure fails, the $N_{TA}$ value is set to a temporarily recorded $N_{TA}$ value before the random access response message is received, and the PUR-TA timer is set to the sum of the value of a Legacy-TA timer and the recorded value of the PUR-TA timer.

In 634, in response to determining that the contention resolution succeeds, the recorded $N_{TA}$ value before the random access response message is received and the value of the PUR-TA timer are deleted.

For example, when the contention resolution in the random access procedure succeeds, the recorded $N_{TA}$ value and the value of the PUR-TA timer are deleted.

In an example embodiment, the PUR TA may be coupled with the TA of the random access response (RAR). After dedicated PUR resources are configured for the UE, when the UE is in the idle or inactive state, if the UE has uplink data and the TA is valid, the UE may perform sending on these PUR resources. When the UE enters the connection state, the UE will not release these PUR resources. These PUR resources may be available if the UE enters the idle or inactive state again. When the UE receives a TAC MAC CE carried by a PDCCH or a PUSCH from a base station, the UE updates its own TA value and starts a pur-TimeAlignmentTimer associated with the PUR (if the base station configures the pur-TimeAlignmentTimer of the PUR). If the PUR-TimeAlignmentTimer does not expire, the PUR resources are available; otherwise, the PUR resources are unavailable.

When the UE enters the connection state from the idle or inactive state, the UE may initiate the random access procedure, and when the RAR is received, the RAR carries the TAC. At this point, the UE starts the TA timer adopted in the connection state and updates the TA value. However, the standards do not describe whether the current PUR TA Timer is restarted. The process described above leads to the following problems.

1. At this point, if the RAR is not the current UE and the subsequent RA of the UE fails all the time, the PUR TA Timer may not expire after the TA is updated, but the TA is unavailable, resulting in the failure of PUR transmission.

2. At this point, if the base station does not send the TAC MAC CE when it is in the connection state and the UE does not restart the PUR TA Timer: since the TA value has been updated, although the TA value is valid, the PUR TA Timer may expire, and the UE may mistakenly think that the PUR is unavailable; and if the base station does not send the TAC MAC CE when it is in the connection state but the UE restarts the PUR TA Timer: since the TA value has been updated, although the TA value is valid, the PUR TA Timer may expire, and the UE may mistakenly think that the PUR is unavailable.

The above-mentioned problems may be solved in the following manners.

Manner one: The UE restarts the PUR TA timer (if the PUR TA timer is configured) when the UE receives the RAR and the RAR carries the TAC. After the UE initiates the random access procedure, the UE receives the RAR, but the RAR received by the UE may not be the RAR belonging to the UE and may be the RAR belonging to another UE belonging that involves in the contention conflict, and the UEs cannot be distinguished in the RAR. The UE may receive the RAR, and the UE starts a PUR-related TA timer. If the RAR is not the RAR of the UE, the RACH procedure fails. Then, the UE may continue to initiate the random access procedure, and if the RAR is received, the UE may continue to restart the PUR-related TA timer until the random access procedure succeeds. When the random access procedure succeeds, the UE synchronous succeeds, and the PUR-related TA timer is started.

Manner two: The UE initiates the random access procedure, and after the contention resolution succeeds, the UE starts the PUR-related TA timer (if the PUR-related TA timer is configured). After the contention resolution succeeds, the RAR definitely belongs to the UE, and the TA value carried in the RAR also belongs to the UE. At this point, the UE starts the PUR-related TA timer again.

Manner three: The UE maintains two $N_{TA}$ values in the RA procedure. After the UE receives the RAR, the UE temporarily records the $N_{TA}$ value (PUR-$N_{TA}$) before the RAR and then starts to maintain the legacy $N_{TA}$, for example, the UE uses the TAC in the RAR as the current $N_{TA}$ value (apply the Timing Advance Command for this TAG) and starts or restarts the TA Timer of Legacy but not the PUR-TA Timer. If the RA contention resolution fails, the legacy $N_{TA}$ value is restored to PUR-$N_{TA}$. If the RA contention resolution succeeds, the PUR-$N_{TA}$ is deleted and the PUR-TA Timer is reassigned to the TA Timer of Legacy.

Manner four: The UE maintains two $N_{TA}$ values in the RA procedure. After the UE receives the RAR, the UE temporarily records the $N_{TA}$ value (PUR-$N_{TA}$) before the RAR and the value of the PUR TA Timer, then starts to maintain the legacy $N_{TA}$ (apply the Timing Advance Command for this TAG), starts or restarts the TA Timer of Legacy, and restarts the PUR-TA Timer. If the RA contention resolution fails, the legacy $N_{TA}$ value is restored to PUR-$N_{TA}$, and the PUR-TA Timer is reassigned to TA Timer of Legacy+recorded PUR TA Timer. If the RA contention resolution succeeds, the recorded PUR-$N_{TA}$ and value of the PUR TA Timer are deleted.

Figure 10:
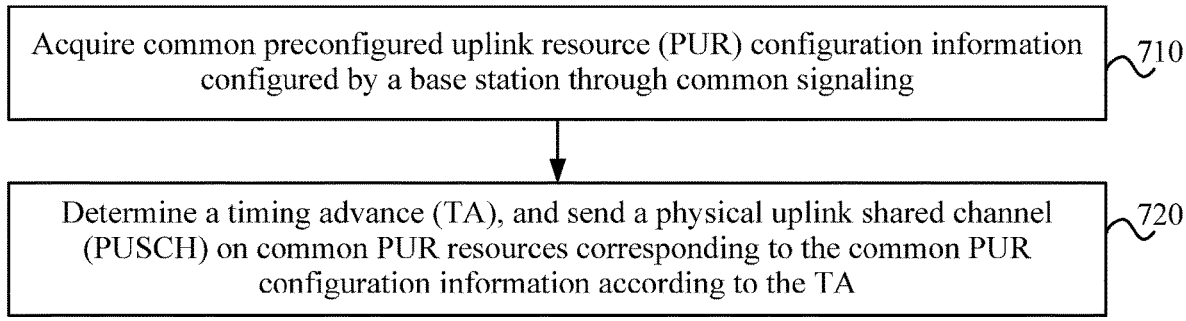
FIG. 10 is a flowchart of a channel transmission method according to an embodiment of the present application.

FIG. 10 is a flowchart of a channel transmission method according to an embodiment of the present application. This embodiment of the present application is applicable to the case of supporting PUR transmission in a non-terrestrial network. The method may be implemented by a software and/or hardware method and is generally integrated in a UE. With reference to FIG. 10, the method provided by this embodiment of the present application specifically includes 710 and 720.

In 710, common PUR configuration information configured by a base station through common signaling is acquired.

In this embodiment of the present application, the base station may also configure the common PUR configuration information through common signaling, and the UE may receive the common PUR configuration information and configure a common PUR resource according to the common PUR configuration information.

In 720, a TA is determined, and a PUSCH is sent on a common PUR resource corresponding to the common PUR configuration information according to the TA.

For example, the UE may determine the TA and sends the PUSCH the common PUR resource corresponding to the common PUR configuration information according to the TA.

In this embodiment of the present application, common PUR configuration information configured by a base station is received, where the common PUR configuration information is transmitted through common signaling; and a TA is determined, and a PUSCH is selected on a common PUR resource according to the TA to be sent, thereby achieving channel transmission based on the PUR function in non-terrestrial networks, saving radio resources and reducing the power consumption of the UE.

In an embodiment, on the basis of the embodiment described above, the TA is determined in the following manner.

The TA is determined according to satellite positioning.

In this embodiment of the present application, the UE may determine the TA through satellite positioning.

Figure 11:
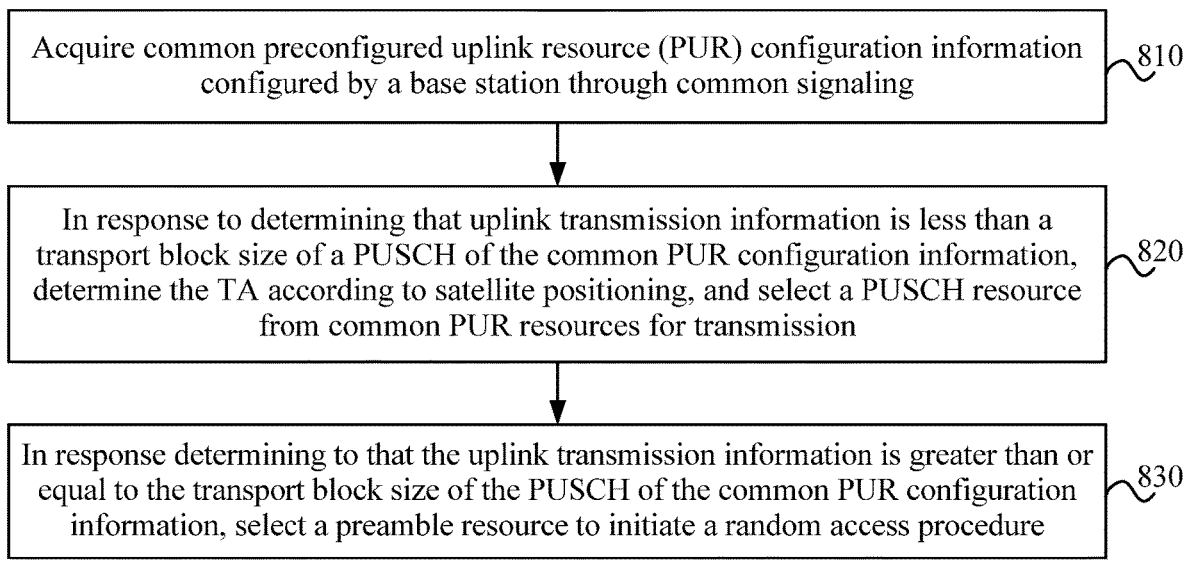
FIG. 11 is a flowchart of another channel transmission method according to an embodiment of the present application.

FIG. 11 is a flowchart of another channel transmission method according to an embodiment of the present application. This embodiment of the present application is an example on the basis of the embodiments described above. With reference to FIG. 11, the method provided by this embodiment of the present application specifically includes 810, 820, and 830.

In 810, common PUR configuration information configured by a base station through common signaling is acquired.

In 820, in response to determining that uplink transmission information is less than a transport block (TB) size of a PUSCH of the common PUR configuration information, the TA is determined according to satellite positioning, and a PUSCH resource is selected from the common PUR resources for transmission.

In this embodiment of the present application, when the uplink transmission information of the UE is less than the TB size of the PUSCH of the common PUR configuration information, the TA is determined according to a satellite, and a PUSCH resource is selected from PUR resources for transmitting the uplink transmission information.

In 830, in response to determining that the uplink transmission information is greater than or equal to the TB size of the PUSCH of the common PUR configuration information, a preamble resource is selected to initiate a random access procedure.

For example, if the uplink transmission information of the UE is greater than or equal to the TB size of the PUSCH of the common PUR configuration information, a random access procedure may be initiated using a manner of the preamble to achieve the sending of the PUSCH.

Figure 12:
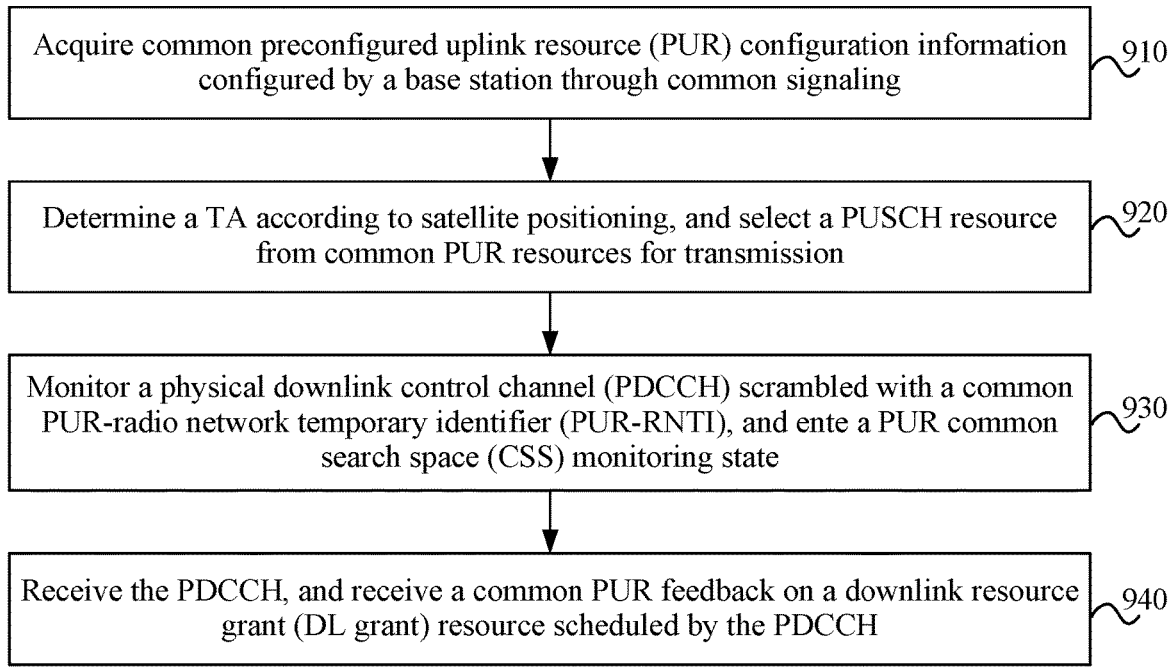
FIG. 12 is a flowchart of another channel transmission method according to an embodiment of the present application.

FIG. 12 is a flowchart of another channel transmission method according to an embodiment of the present application. This embodiment of the present application is an example on the basis of the embodiments described above. With reference to FIG. 12, the method provided by this embodiment of the present application specifically includes 910, 920, 930, and 940.

In 910, common PUR configuration information configured by a base station through common signaling is acquired.

In 920, the TA is determined according to satellite positioning, and a PUSCH resource is selected from the common PUR resources for transmission.

In this embodiment of the present application, the UE may determine the TA according to satellite positioning and select a PUSCH resource from common PUR resources configured in the common PUR configuration information for uplink information transmission.

In 930, a PDCCH scrambled with a common PUR-RNTI is monitored, and enter a PUR CSS monitoring state.

For example, the UE accesses the PUR CSS monitoring state and monitors the PDCCH scrambled with the common PUR-RNTI.

In 940, the PDCCH is received, and a common PUR feedback is received on a downlink resource grant (DL grant) resource scheduled by the PDCCH.

In this embodiment, the UE may receive the PDCCH and receive the common PUR feedback on the DL grant resource scheduled by the PDCCH.

In an embodiment, on the basis of the embodiment described above, the common PUR feedback includes at least one of: a UE ID, a cell-radio network temporary identifier (C-RNTI), a USS, an uplink resource grant (UL grant), a downlink resource grant (DL grant) or a PUR transmission end indication.

In an embodiment, on the basis of the embodiment described above, the method further includes: in response to determining that the UE ID in the common PUR feedback is consistent with a local UE ID, it is determined that matching succeeds and UE identification is completed.

For example, when the UE ID in the common PUR feedback is consistent with the local UE ID, the UE identification is determined to be completed.

In an embodiment, on the basis of the embodiment described above, in response to determining that the UE ID in the common PUR feedback is consistent with the local UE ID, it is determined that matching succeeds and UE identification is completed in at least one of the following manners. In response to determining that the common PUR feedback carries the PUR transmission end indication, a common PUR transmission is completed, and an idle state is returned.

In response to determining that the common PUR feedback carries a UE-specific radio network temporary identifier (RNTI), the USS, the UL grant and/or a DL grant indication, enter a PUR USS monitoring state.

In response to determining that the common PUR feedback carries an RRC connection establishment message, enter an RRC connection state.

In response to determining that the common PUR feedback carries a UE-specific RNTI and does not carry the USS, the USS is set according to a CSS configuration.

Figure 13:
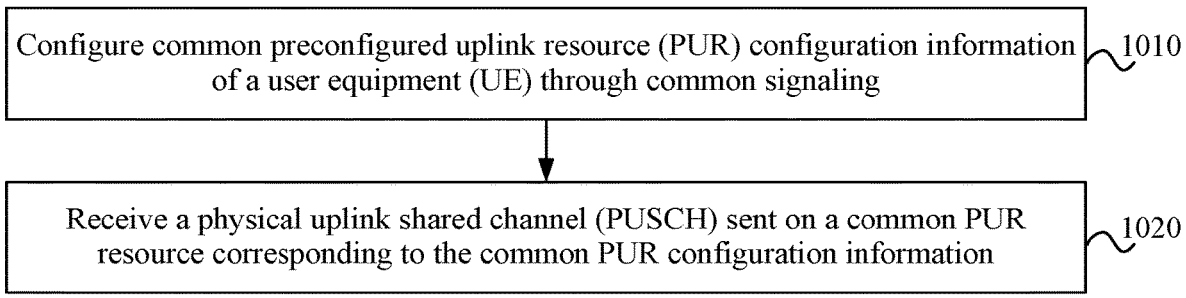
FIG. 13 is a flowchart of a channel transmission method according to an embodiment of the present application.

FIG. 13 is a flowchart of a channel transmission method according to an embodiment of the present application. This embodiment of the present application is applicable to the case of supporting PUR transmission in a non-terrestrial network. The method may be implemented by a software and/or hardware method and is generally integrated into a base station. With reference to FIG. 13, the method provided by this embodiment of the present application specifically includes 1010 and 1020.

In 1010, common PUR configuration information of a UE is configured through common signaling. In this embodiment of the present application, the base station may configure the common PUR configuration information through common signaling so that the UE may configure a PUR resource according to the common PUR configuration information.

In 1020, a PUSCH sent on a common PUR resource corresponding to the common PUR configuration information is received.

For example, the base station may receive the PUSCH sent by the UE through the common PUR resource.

In this embodiment of the present application, the base station configures common PUR configuration information of the UE, where the common PUR configuration information is transmitted from the base station to the UE through common signaling; and the base station receives a PUSCH on the common PUR resource corresponding to the common PUR configuration information, thereby achieving channel transmission based on the PUR function in non-terrestrial networks, saving radio resources and reducing the power consumption of the UE.

In an embodiment, on the basis of the embodiment described above, the method further includes: a PDCCH scrambled with a common PUR-RNTI is sent to the UE to control the UE to receive a common PUR feedback; and the common PUR feedback is sent on a DL grant resource to the UE. In this embodiment of the present application, the base station may scramble the PDCCH through the common PUR-RNTI and send the PDCCH to the UE to control the UE to receive the common PUR feedback; and after the base station sends the PDCCH, the base station may send the common PUR feedback on the DL grant resource to the UE.

In an embodiment, on the basis of the embodiments described above, the common PUR feedback includes at least one of:

a UE ID, a C-RNTI, a USS, a UL grant, a DL grant or a PUR transmission end indication.

Figure 14:
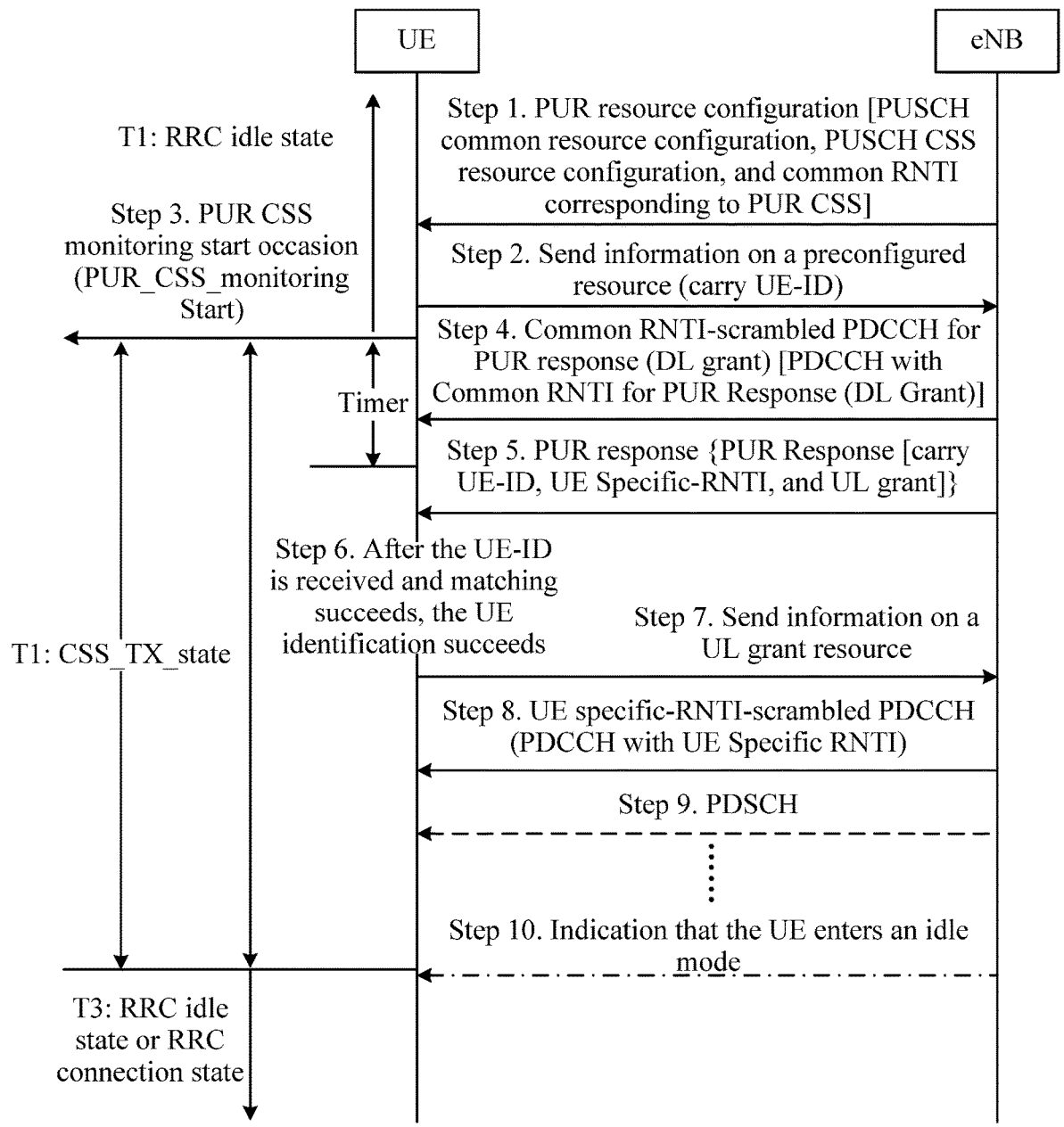
FIG. 14 is a diagram showing a channel transmission method according to an embodiment of the present application.

In an example embodiment, with reference to FIG. 14, the common PUR resource configuration and transmission may include the following: Step 1: the base station configures common PUR resource information for the UE through common signaling (system information block, SIB), where the common PUR resource information includes at least one of: a common PUSCH resource configuration, a PUR CSS configuration or a common PUR_RNTI.

The common PUSCH resource configuration includes at least one of: a PUSCH resource time domain start location, a PUSCH resource period, a PUSCH resource frequency domain location, PUSCH resource physical layer scheduling signaling or the like.

The PUR CSS configuration may be an RA-CSS or a PUR CSS explicitly configured by the base station.

The common PUR_RNTI may be a PUR-RNTI calculated by the UE based on the time-frequency domain location of the common PUSCH resource, or a PUR-RNTI configured by the base station for the UE through signaling, or a certain RNTI predefined by the standards.

Step 2: If the UE has the uplink transmission requirement, the cell where the UE camps has common PUR configuration information:

For the control plane data transmission scheme, if the uplink transmission information is less than the TB size that the PUSCH may carry in the PUR configuration information, a TA is calculated based on information such as satellite positioning, and a PUSCH resource is selected from the common PUR resource information for common PUR transmission; otherwise, a PREAMBLE resource is selected to initiate a random access procedure.

For the user plane data transmission scheme, a TA is calculated based on information such as satellite positioning, and a PUSCH resource is selected from the common PUR resource information for common PUR transmission. If the PUSCH resource cannot carry all the user data during the common PUR transmission, the remaining data segments may be transmitted on a dedicated PUSCH resource scheduled by the PDCCH after Step 5 (after the UE identification succeeds) or may be transmitted on the dedicated PUSCH resource scheduled by the PDCCH after the UE switches to the connection mode.

The uplink information transmission includes the UE ID and at least includes user data and RRC Msg3 signaling.

The UE ID may be a non-access stratum (NAS) UE ID or a UE ID allocated by the network side; and the UE ID may be included in a MAC CE or in RRC signaling.

Step 3: After the UE sends the common PUR transmission, the UE shifts backward n sub-frames to monitor the PDCCH scrambled with the common PUR_RNTI and enters the PUR CSS monitoring state.

Step 4: The UE receives the PDCCH scrambled with the common PUR_RNTI.

Step 5: The UE receives a common PUR Response on a DL Grant resource scheduled by the PDCCH scrambled with the common PUR_RNTI.

The common PUR Response may include at least one of: a UE ID, a UE-specific C-RNTI, a USS, a UL grant, a DL grant or a PUR transmission end indication.

Step 6: The UE compares the received UE ID with its own UE ID, and if the matching succeeds, the UE completes the identification, which specifically may be performed in the following manner.

1. If the PUR Response carries the PUR transmission end indication, the UE completes the common PUR transmission and returns to the idle state.

2. If the PUR Response carries the UE-specific C-RNTI, the USS, the UL grant and/or the DL grant indication, enter the PUR USS monitoring state (the subsequent procedure is the same as the current PUR procedure, which can be simply supplemented).

3. If the PUR Response carries an RRC connection establishment message, the UE enters the RRC connection state.

4. If the PUR Response carries the UE specific C-RNTI but does not carry the PUR USS, the PUR USS still uses the PUR CSS configuration.

Figure 15:
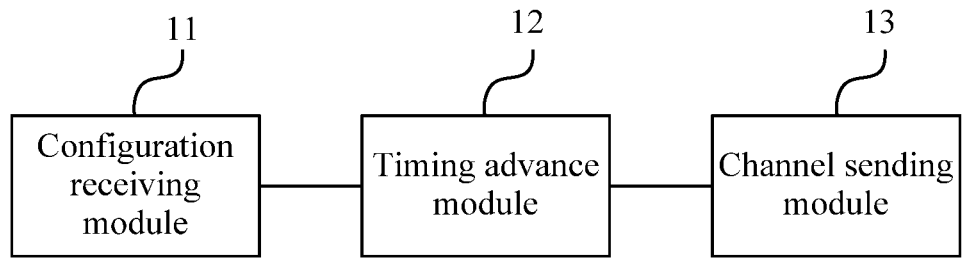
FIG. 15 is a structural diagram of a channel transmission apparatus according to an embodiment of the present application.

FIG. 15 is a structural diagram of a channel transmission apparatus according to an embodiment of the present application. The apparatus can execute the channel transmission method provided by any one of the embodiments of the present application and has corresponding functional modules and beneficial effects for executing the method. The apparatus may be implemented by software and/or hardware and specifically includes a configuration receiving module 11, a TA module 12, and a channel sending module 13.

The configuration receiving module 11 is configured to receive PUR configuration information configured by a base station through dedicated signaling.

The TA module 12 is configured to, in response to determining before a time domain location of a PUR resource corresponding to the PUR configuration information that the PUR resource belongs to a current camping cell, determine a TA.

The channel sending module 13 is configured to, in response to being in a target service state, send a PUSCH using the TA on the PUR resource, where the target service state indicates that no RRC connection exists with the base station.

In this embodiment of the present application, the configuration receiving module 11 receives PUR configuration information configured by a base station, where the PUR configuration information is transmitted through dedicated signaling; the TA module 12 determines a TA in response to determining before the time domain location of a PUR resource corresponding to the PUR configuration information that the PUR resource belongs to a current camping cell; and the channel sending module 13 sends a PUSCH on the PUR resource based on the TA in response to being in a target service state, thereby achieving channel transmission based on the PUR function in non-terrestrial networks, saving radio resources and reducing the power consumption of the UE.

In an embodiment, in the embodiments described above, the target service state in the apparatus includes at least one of: an RRC_IDLE state or an RRC_INACTIVE state.

In an embodiment, on the basis of the embodiments described above, the PUR configuration information in the apparatus includes at least one of:
 a PUR period, a PUR-ResponseWindowTimer, a cell ID, a PUR-USS, a PUSCH resource configuration, time domain start location information of the PUSCH resource, frequency domain location information of the PUSCH resource, a pur-TimeAlignmentTimer, an RSRP change threshold, a USS monitoring maximum duration, a PUR-RNTI, a PUR resource effective number, a serving cell preamble, a neighboring cell preamble, a serving cell response reference signal configuration, a neighboring cell response reference signal configuration, a scheduling request resource or a CG resource.

In an embodiment, on the basis of the embodiments described above, the PUR configuration information in the apparatus includes PUR resource lists of at least two cells, where each PUR resource list includes at least one of:
 a PUR resource common configuration portion or a PUR resource cell-level configuration portion, where the PUR resource common configuration portion includes at least one of: a PUR period or a PUR-ResponseWindowTimer, and the PUR resource cell-level configuration portion includes at least one of: a cell ID, a PUR-USS, a PUSCH resource configuration, time domain start location information of the PUSCH resource, frequency domain location information of the PUSCH resource, a pur-TimeAlignmentTimer, an RSRP change threshold, a USS monitoring maximum duration, a PUR-RNTI or a PUR resource effective number.

In an embodiment, on the basis of the embodiments described above, the PUSCH resource time domain location information in the apparatus is represented in at least one of the following manners.

The time domain location information of the PUSCH resource is represented according to the absolute time of a satellite clock.

The time domain location information of the PUSCH resource is represented according to the absolute time of the satellite clock and the relative time of wireless synchronization with the base station.

In an embodiment, on the basis of the embodiments described above, the TA module 12 includes a historical information unit and a satellite determination unit.

The historical information unit is configured to acquire the TA according to historical TA record information, where a validity of the historical TA record information is determined through a pur-TimeAlignmentTimer and/or an RSRP change threshold.

The satellite determination unit is configured to acquire the TA according to satellite positioning information.

In an embodiment, on the basis of the embodiments described above, the pur-TimeAlignmentTimer in the apparatus is configured in at least one of the following manners.

The pur-TimeAlignmentTimer is configured according to a UE.

The pur-TimeAlignmentTimer is configured according to a PUR resource cell-level configuration portion.

Figure 16:
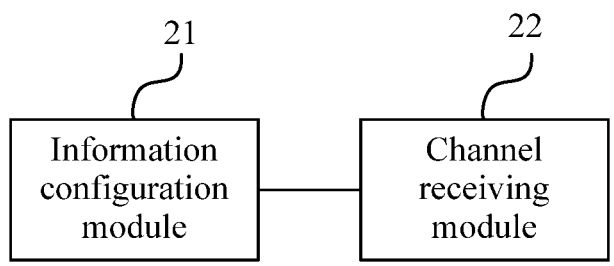
FIG. 16 is a structural diagram of another channel transmission apparatus according to an embodiment of the present application.

FIG. 16 is a structural diagram of a channel transmission apparatus according to an embodiment of the present application. The apparatus can execute the channel transmission method provided by any one of the embodiments of the present application and has corresponding functional modules and beneficial effects for executing the method. The apparatus may be implemented by software and/or hardware and specifically includes an information configuration module 21 and a channel receiving module 22.

The information configuration module 21 is configured to configure PUR configuration information of a UE through dedicated signaling.

The channel receiving module 22 is configured to receive a PUSCH transmitted on a PUR resource corresponding to the PUR configuration information.

In this embodiment of the present application, the information configuration module 21 configures PUR configuration information of a UE through dedicated signaling, and the channel receiving module 22 receives a PUSCH transmitted on a PUR resource corresponding to the PUR configuration information, thereby achieving channel transmission based on the PUR function in non-terrestrial networks, saving radio resources and reducing the power consumption of the UE.

In an embodiment, on the basis of the embodiments described above, the PUR configuration information in the apparatus includes at least one of:

a PUR period, a PUR-ResponseWindowTimer, a cell ID, a PUR-USS, a PUSCH resource configuration, time domain start location information of the PUSCH resource, frequency domain location information of the PUSCH resource, a pur-TimeAlignmentTimer, an RSRP change threshold, a USS monitoring maximum duration, a PUR-RNTI, a PUR resource effective number, a serving cell preamble, a neighboring cell preamble, a serving cell response reference signal configuration, a neighboring cell response reference signal configuration, a scheduling request resource or a CG resource.

In an embodiment, on the basis of the embodiments described above, the PUR configuration information in the apparatus includes PUR resource lists of at least two cells, where each PUR resource list includes at least one of:

a PUR resource common configuration portion or a PUR resource cell-level configuration portion, where the PUR resource common configuration portion includes at least one of: a PUR period or a PUR-ResponseWindowTimer, and the PUR resource cell-level configuration portion includes at least one of: a cell identity, a PUR-USS, a PUSCH resource configuration, time domain start location information of the PUSCH resource, frequency domain location information of the PUSCH resource, a time alignment timer, an RSRP change threshold, a USS monitoring maximum duration, a PUR-RNTI or a PUR resource effective number.

In an embodiment, on the basis of the embodiments described above, the frequency domain location information of the PUSCH resource in the apparatus is represented in at least one of the following manners.

The frequency domain location information of the PUSCH resource is represented according to the absolute time of a satellite clock.

The frequency domain location information of the PUSCH resource is represented according to the absolute time of the satellite clock and the relative time of wireless synchronization with the UE.

In an embodiment, on the basis of the embodiments described above, the pur-TimeAlignmentTimer in the apparatus is configured in at least one of the following manners.

The pur-TimeAlignmentTimer is configured according to a UE.

The pur-TimeAlignmentTimer is configured according to a PUR resource cell-level configuration portion.

In an embodiment, on the basis of the embodiments described above, the apparatus further includes a resource configuration module and a resource sending module.

The resource configuration module is configured to determine a target camping cell according to at least one of a UE time domain location, a UE movement track or a cell movement track and configure a PUR resource.

The resource sending module is configured to send the PUR resource to the UE through a current camping cell of the UE.

In an embodiment, on the basis of the embodiments described above, the apparatus further includes a target determination module and a resource forwarding module.

The target determination module is configured to determine a target base station of the UE according to at least one of a UE time domain location, a UE movement track or a cell movement track.

The resource forwarding module is configured to receive a PUR resource configured by the target base station and send the PUR resource to the UE.

In an embodiment, on the basis of the embodiments described above, the apparatus further includes a resource request module and a resource sending module.

The resource request module is configured to request by a CU of a base station a PUR resource from a DU of the base station through a PUR resource request.

The resource sending module is configured to configure by the DU a PUR resource according to the PUR resource request and send the PUR resource to the CU.

In an embodiment, on the basis of the embodiments described above, the PUR resource request in the apparatus includes at least one of:

target cell ID information, a PUR resource message size, a PUSCH resource time domain start location, a PUSCH resource period, UE location information, UE movement track information or current camping cell location information.

In an embodiment, on the basis of the embodiments described above, the apparatus further includes a resource release module.

The resource release module is configured to send by the CU a PUR resource release indication to the DU to release the PUR resource, where the PUR resource release indication includes at least one of: target cell ID information, a time domain location of the PUR resource and/or a frequency domain location of the PUR resource, a PUSCH resource period or UE location information.

In an embodiment, on the basis of the embodiments described above, in the apparatus, the DU stores time domain information of the PUR resource and frequency domain information of the PUR resource, and the CU stores a security key configured by a PUR and AS context information configured by the PUR.

Figure 17:
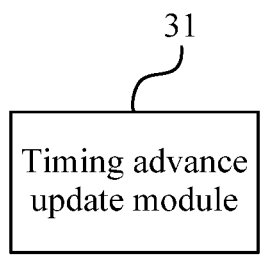
FIG. 17 is a structural diagram of another TA update apparatus according to an embodiment of the present application.

FIG. 17 is a structural diagram of another TA update apparatus according to an embodiment of the present application. The apparatus can execute the TA update method provided by any one of the embodiments of the present application and has corresponding functional modules and beneficial effects for executing the method. The apparatus may be implemented by software and/or hardware and specifically includes a TA update module 31, which is configured to update a TA of a PUR resource according to a received random access response message.

In an embodiment, on the basis of the embodiments described above, the TA update module 31 includes a restart unit.

The restart unit is configured to, in response to receiving a random access response message carrying a TAC, restart a pur-TimeAlignmentTimer of the PUR resource.

In an embodiment, on the basis of the embodiments described above, the TA update module 31 includes a random access unit and a first update unit.

The random access unit is configured to receive the random access response message and start a random access contention resolution procedure.

The first update unit is configured to, in response to determining that a contention resolution succeeds in a random access process, restart a TA timer corresponding to a PUR.

In an embodiment, on the basis of the embodiments described above, the TA update module 31 includes a second access response unit and a second update unit.

The second access response unit is configured to receive the random access response message, temporarily record an $N_{TA}$ value before the random access response message is received, and initialize a TA timer.

The second update unit is configured to, in response to determining that a contention resolution fails, set the $N_{TA}$ value to a temporarily recorded $N_{TA}$ value before the random access response message is received, and in response to determining that a contention resolution succeeds, delete the temporarily recorded $N_{TA}$ value before the random access response message is received, and set a PUR-TA timer to a value of the TA timer.

In an embodiment, on the basis of the embodiments described above, the TA update module 31 includes a third access response unit, a timing restart unit, and a third update unit.

The third access response unit is configured to receive the random access response message and record the $N_{TA}$ value before the random access response message and a value of the PUR-TA timer.

The timing restart unit is configured to restart the TA timer and the PUR-TA timer.

The third update unit is configured to, in response to determining that a contention resolution fails, restore the $N_{TA}$ value to a temporarily recorded $N_{TA}$ value before the random access response message, and reassign the PUR-TA timer to the sum of a TA timer value and the recorded value of the PUR-TA timer; and in response to determining that the contention resolution succeeds, delete the recorded $N_{TA}$ value before the random access response message is received and the value of the PUR-TA timer.

Figure 18:
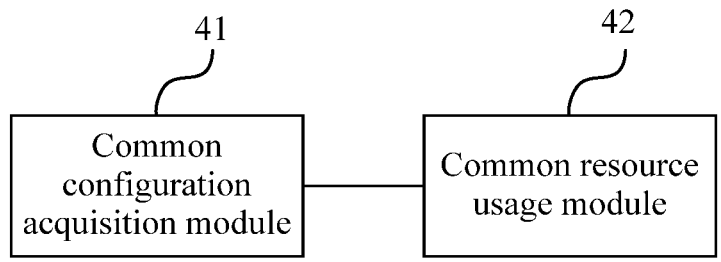
FIG. 18 is a structural diagram of a channel transmission apparatus according to an embodiment of the present application.

FIG. 18 is a structural diagram of a channel transmission apparatus according to an embodiment of the present application. The apparatus can execute the channel transmission method provided by any one of the embodiments of the present application and has corresponding functional modules and beneficial effects for executing the method. The apparatus may be implemented by software and/or hardware and specifically includes a common configuration acquisition module 41 and a common resource usage module 42.

The common configuration acquisition module 41 is configured to acquire common PUR configuration information configured by a base station through common signaling.

The common resource usage module 42 is configured to determine a TA and send a PUSCH on a common PUR resource corresponding to the common PUR configuration information according to the TA.

In this embodiment of the present application, common configuration acquisition module 41 receives common PUR configuration information configured by a base station, where the common PUR configuration information is transmitted through common signaling; and the common resource usage module 42 determines a TA and sends a PUSCH on a PUR resource based on the TA, thereby achieving channel transmission based on the PUR function in non-terrestrial networks, saving radio resources and reducing the power consumption of the UE.

In an embodiment, on the basis of the embodiments described above, the common resource usage module 42 includes a satellite determination unit.

The satellite determination unit is configured to determine the TA according to satellite positioning.

In an embodiment, on the basis of the embodiments described above, the common resource usage module 42 includes a first transmission unit and a second transmission unit.

The first transmission unit is configured to, in response to determining that uplink transmission information is less than a TB size of a PUSCH of the common PUR configuration information, determine the TA according to satellite positioning and select a PUSCH resource from the common PUR resources for transmission.

The second transmission unit is configured to, in response to determining that the uplink transmission information is greater than or equal to the TB size of the PUSCH of the common PUR configuration information, select a preamble resource to initiate a random access procedure.

In an embodiment, on the basis of the embodiments described above, the common resource usage module 42 includes a resource transmission unit.

The resource transmission unit is configured to determine the TA according to satellite positioning and select a PUSCH resource from the common PUR resources for transmission.

In an embodiment, on the basis of the embodiments described above, the apparatus further includes a monitoring module and a feedback receiving module.

The monitoring module is configured to monitor a PDCCH scrambled with a common PUR-RNTI and enter a PUR CSS monitoring state.

The feedback receiving module is configured to receive the PDCCH and receive a common PUR feedback on a DL grant resource scheduled by the PDCCH.

In an embodiment, on the basis of the embodiments described above, the common PUR feedback in the apparatus includes at least one of: a UE ID, a C-RNTI, a USS, a UL grant, a DL grant or a PUR transmission end indication.

In an embodiment, on the basis of the embodiments described above, the apparatus further includes a UE identification module.

The UE identification module is configured to, in response to determining that the UE ID in the common PUR feedback is consistent with a local UE ID, determine that matching succeeds and UE identification is completed.

In an embodiment, on the basis of the embodiments described above, the UE identification module is configured to: in response to determining that the common PUR feedback carries the PUR transmission end indication, complete a common PUR transmission and return to an idle state; in response to determining that the common PUR feedback carries a UE-specific radio network temporary identifier (RNTI), the USS, the UL grant and/or a DL grant indication, enter a PUR US S monitoring state; in response to determining that the common PUR feedback carries an RRC connection establishment message, enter an RRC connection state; and in response to determining that the common PUR feedback carries the UE-specific RNTI and does not carry the USS, set the USS according to a CSS configuration.

Figure 19:
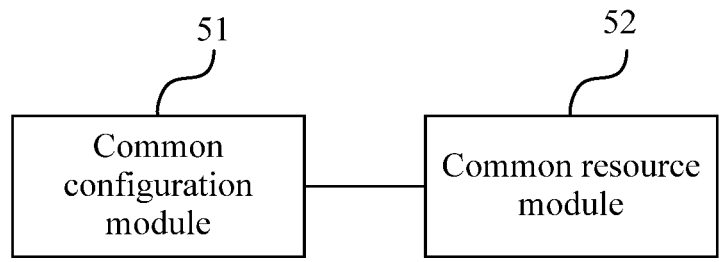
FIG. 19 is a structural diagram of another channel transmission apparatus according to an embodiment of the present application.

FIG. 19 is a structural diagram of another channel transmission apparatus according to an embodiment of the present application. The apparatus can execute the channel transmission method provided by any one of the embodiments of the present application and has corresponding functional modules and beneficial effects for executing the method. The apparatus may be implemented by software and/or hardware and specifically includes a common configuration module 51 and a common resource module 52.

The common configuration module 51 is configured to configure common PUR configuration information of a UE through common signaling.

The common resource module 52 is configured to receive a PUSCH sent on a common PUR resource corresponding to the common PUR configuration information.

In this embodiment of the present application, the common configuration module 51 configures common PUR configuration information of the UE, where the common PUR configuration information is transmitted from the base station to the UE through common signaling; and the common resource module 52 receives a PUSCH on the common PUR resource corresponding to the common PUR configuration information, thereby achieving channel transmission based on the PUR function in non-terrestrial networks, saving radio resources and reducing the power consumption of the UE.

In an embodiment, on the basis of the embodiments described above, the apparatus further includes a control channel unit and a common feedback unit.

The control channel unit is configured to send a PDCCH scrambled with a common PUR-RNTI to the UE to control the UE to receive a common PUR feedback.

The common feedback unit is configured to send the common PUR feedback on the DL Grant resource to the UE.

In an embodiment, on the basis of the embodiments described above, the common PUR feedback in the apparatus includes at least one of: a UE ID, a C-RNTI, a USS, a UL grant, a DL grant or a PUR transmission end indication.

Figure 20:
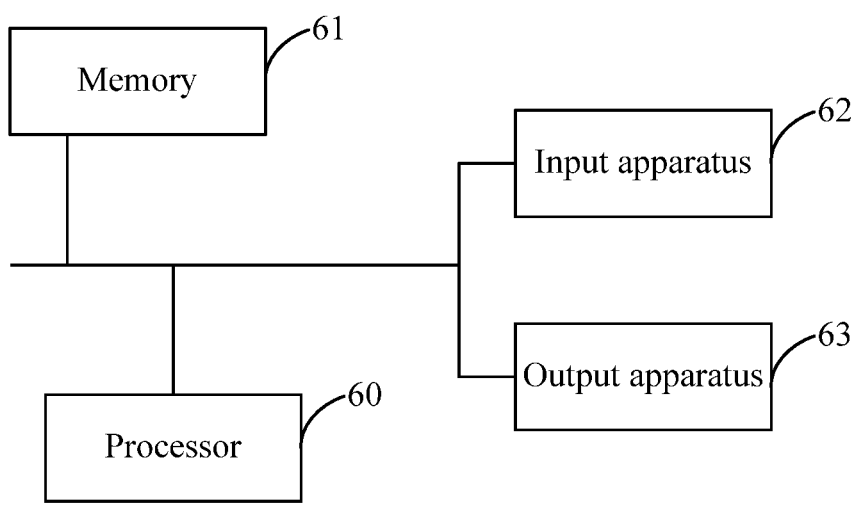
FIG. 20 is a structural diagram of a UE according to an embodiment of the present application.

FIG. 20 is a structural diagram of a UE according to an embodiment of the present application. As shown in FIG. 20, the UE includes a processor 60, a memory 61, an input apparatus 62, and an output apparatus 63. The number of processors 70 in the UE may be one or more, and one processor 60 is illustrated in FIG. 20. The processor 60, the memory 61, the input apparatus 62, and the output apparatus 63 in the UE may be connected via a bus or in other ways, and the connection via a bus is illustrated in FIG. 12.

As a computer-readable storage medium, the memory 61 may be configured to store software programs, computer-executable programs and modules, such as program instructions/modules corresponding to the channel transmission method in the embodiments of the present application (for example, the configuration receiving module 11, the TA module 12, the channel sending module 13, the common configuration acquisition module 41 and the common resource usage module 42). The processor 60 runs the software programs, instructions or modules stored in the memory 61 to execute function applications and data processing of the UE, that is, to implement the channel transmission method described above.

The memory 61 may mainly include a program storage area and a data storage area. The program storage area may store an operating system and an application program required by at least one function. The data storage area may store data created based on the use of the UE. Furthermore, the memory 61 may include a high-speed random-access memory, and may also include a non-volatile memory such as at least one disk memory, flash memory or other non-volatile solid-state memories. In some examples, the memory 61 may further include memories that are remotely disposed with respect to the processor 60. These remote memories may be connected to the UE via a network. Examples of the preceding network include, but are not limited to, the Internet, an intranet, a local area network, a mobile communication network, and a combination thereof.

The input device 62 may be used for receiving inputted digital or character information and for generating key signal input related to user settings and function control of the UE. The output apparatus 63 may include display devices such as display screens.

In an embodiment, the UE may further store the TA update module 31 of the TA update apparatus of the present application.

Figure 21:
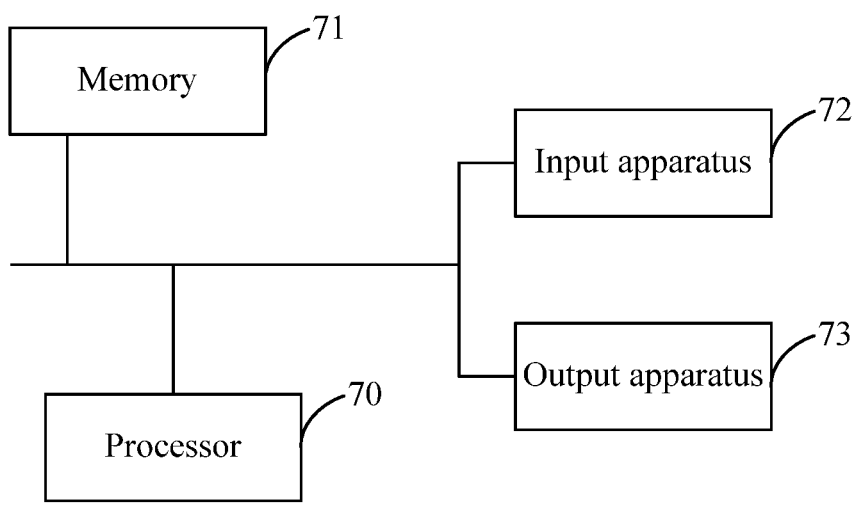
FIG. 21 is a structural diagram of a base station according to an embodiment of the present application.

FIG. 21 is a structural diagram of a base station according to an embodiment of the present application. As shown in FIG. 21, the base station includes a processor 70, a memory 71, an input apparatus 72, and an output apparatus 73. The number of processors 70 in the base station may be one or more, and one processor 70 is illustrated in FIG. 21. The processor 70, the memory 71, the input apparatus 72, and the output apparatus 73 in the base station may be connected via a bus or in other ways, and the connection via a bus is illustrated in FIG. 12.

As a computer-readable storage medium, the memory 71 may be configured to store software programs, computer-executable programs and modules, such as program instructions/modules corresponding to the channel transmission method in the embodiments of the present application (for example, the information configuration module 21, the channel receiving module 22, the common configuration module 51 and the common resource module 52). The processor 70 runs the software programs, instructions or modules stored in the memory 71 to execute function applications and data processing of the base station, that is, to implement the channel transmission method described above.

The memory 71 may mainly include a program storage region and a data storage region. The program storage region may store an operating system and an application program required for at least one function, and the data storage region may store data or the like created according to the use of the base station. Furthermore, the memory 71 may include a high-speed random-access memory, and may also include a non-volatile memory such as at least one disk memory, flash memory or other non-volatile solid-state memories. In some examples, the memory 71 may further include memories that are remotely disposed with respect to the processor 70. These remote memories may be connected to the base station via a network. Examples of the preceding network include, but are not limited to, the Internet, an intranet, a local area network, a mobile communication network, and a combination thereof.

The input apparatus 72 may be used for receiving inputted digital or character information and for generating key signal input related to user settings and function control of the base station. The output apparatus 73 may include display devices such as display screens.

An embodiment of the present application further provides a storage medium including computer-executable instructions that are used for, when executed by a computer processor, performing a channel transmission control method. The method includes the following.

PUR configuration information configured by a base station through dedicated signaling is received.

In response to determining before the time domain location of a PUR resource corresponding to the PUR configuration information that the PUR resource belongs to a current camping cell, a TA is determined.

In response to being in a target service state, a PUSCH is sent using the TA on the PUR resource, where the target service state indicates that no RRC connection exists with the base station.

Alternatively, the method includes the following:

PUR configuration information of a UE is configured through dedicated signaling.

A PUSCH transmitted on a PUR resource corresponding to the PUR configuration information is received.

From the above description of embodiments, it will be apparent to those skilled in the art that the present application may be implemented by means of software and necessary general-purpose hardware, or may be implemented by hardware, but in many cases the former is a preferred embodiment. Based on this understanding, the technical solutions provided by the present application substantially, or the part contributing to the related art, may be embodied in the form of a software product. The software product is stored in a computer-readable storage medium, such as a computer floppy disk, a read-only memory (ROM), a random-access memory (RAM), a flash, a hard disk or an optical disk, and includes several instructions for enabling a computer device (which may be a personal computer, a server or a network device) to execute the method described in the embodiments of the present application.

It is to be noted that units and modules involved in the embodiments of the channel transmission device are just divided according to functional logic, and the division is not limited to this, as long as the corresponding functions can be implemented. In addition, the specific names of functional units are just intended to distinguish, and not to limit the scope of the present application.

It is to be understood by those having ordinary skill in the art that functional modules/units in all or part of the steps of the method, the system and the apparatus disclosed herein may be implemented as software, firmware, hardware and appropriate combinations thereof.

In the hardware implementation, the division of the functional modules/units mentioned in the above description may not correspond to the division of physical components. For example, one physical component may have several functions, or one function or step may be executed jointly by several physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and capable of being accessed by a computer. Moreover, as is known to those having ordinary skill in the art, the communication media generally include computer-readable instructions, data structures, program modules or other data in carriers or in modulated data signals transported in other transport mechanisms and may include any information delivery medium.

The preferred embodiments of the present application are illustrated with reference to drawings and are not intended to limit the scope of the present application. Any modification, equivalent substitution and improvement made by those skilled in the art without departing from the scope and spirit of the present application shall fall within the scope of the present application.

What is claimed is:

1. A method of a timing advance (TA) update of a preconfigured uplink resource (PUR), applied to a user equipment (UE), comprising:
   receiving a random access response message, temporarily recording a timing advance (TA) value ($N_{TA}$) before the random access response message, and starting or restarting a TA timer; and
   in response to determining that a random access contention resolution fails, setting a timing advance value to the temporarily recorded timing advance value ($N_{TA}$) before the random access response message;
   in response to determining that the random access contention resolution succeeds, deleting the temporarily recorded timing advance value ($N_{TA}$) before the random access response message, and setting a PUR-TA timer to a value of a TA timer.

2. The method of claim 1, comprising:
in response to determining that the random access contention resolution fails, not restarting a PUR-TA timer.

3. The method of claim 1, comprising:
in response to receiving the random access response message, not restarting a PUR-TA timer.

4. The method of claim 1, wherein the UE is configured with dedicated PUR resources.

5. The method of claim 1, wherein the UE is configured with the PUR-TA timer.

6. A user equipment (UE), comprising:
one or more processors; and
a memory, configured to store one or more programs;
wherein the one or more programs, when executed by the one or more processors, cause the one or more processors to perform:
receiving a random access response message, temporarily recording a timing advance (TA) value ($N_{TA}$) before the random access response message, and starting or restarting a TA timer; and
in response to determining that a random access contention resolution fails, setting a timing advance value to the temporarily recorded timing advance value ($N_{TA}$) before the random access response message;
in response to determining that the random access contention resolution succeeds, deleting the temporarily recorded timing advance value ($N_{TA}$) before the random access response message, and setting a PUR-TA timer to a value of a TA timer.

7. The UE of claim 6, wherein the one or more processors are further caused to perform:
in response to determining that the random access contention resolution fails, not restarting a PUR-TA timer.

8. The UE of claim 6, wherein the one or more processors are further caused to perform:
in response to receiving the random access response message, not restarting a PUR-TA timer.

9. The UE of claim 6, wherein the UE is configured with dedicated PUR resources.

10. The UE of claim 6, wherein the UE is configured with the PUR-TA timer.

* * * * *